US009096149B2

(12) United States Patent
Schwarzbach et al.

(10) Patent No.: US 9,096,149 B2
(45) Date of Patent: Aug. 4, 2015

(54) ELECTRIC CIGAR LIGHTER, UNIVERSAL POWER SOCKET AND ACCESSORY PLUG

(75) Inventors: Ronald Schwarzbach, Frankfurt am Main (DE); Roger Higgott, Valgioie (IT); Anthony D'Aquila, Trumbull, CT (US)

(73) Assignee: CASCO PRODUCTS CORPORATION, Bridgeport, CT (US)

( * ) Notice: Subject to any disclaimer, the term of this patent is extended or adjusted under 35 U.S.C. 154(b) by 856 days.

(21) Appl. No.: 13/213,607

(22) Filed: Aug. 19, 2011

(65) Prior Publication Data

US 2013/0043230 A1  Feb. 21, 2013

(51) Int. Cl.
   H05B 1/00    (2006.01)
   B60N 3/14    (2006.01)
   H05B 1/02    (2006.01)

(52) U.S. Cl.
   CPC ............... *B60N 3/14* (2013.01); *H05B 1/0213* (2013.01); *H05B 1/0236* (2013.01)

(58) Field of Classification Search
   CPC ....... H05B 1/0213; H05B 1/0236; B60N 3/14
   USPC ......... 219/201, 220, 263, 264, 265, 267, 512, 219/552; 337/77, 365
   See application file for complete search history.

(56) References Cited

U.S. PATENT DOCUMENTS

| 1,944,922 A | 1/1934 | Cohen |
| 2,220,978 A | 11/1940 | Shakespeare et al. |
| 2,292,918 A * | 8/1942 | Ashton ........................ 219/265 |
| 2,498,116 A * | 2/1950 | Sinko ............................ 219/264 |
| 3,573,428 A * | 4/1971 | Dening et al. ................ 219/265 |
| 3,818,179 A | 6/1974 | Mase |
| 3,863,047 A | 1/1975 | Mase |
| 3,878,359 A | 4/1975 | Jannello |
| 4,011,000 A | 3/1977 | Wharton |
| 4,180,302 A | 12/1979 | Gordon |
| 4,207,455 A * | 6/1980 | Horwitt et al. ................ 219/265 |
| 4,456,817 A | 6/1984 | Mehnert et al. |
| 4,650,962 A | 3/1987 | Pramaggiore |

(Continued)

FOREIGN PATENT DOCUMENTS

EP   2 233 353 A1   11/2003
EP   2233353        9/2010

(Continued)

OTHER PUBLICATIONS

International Search Report and Written Opinion dated Aug. 27, 2012 corresponding International Application No. PCT/US2012/42243.

(Continued)

*Primary Examiner* — Thien S Tran
(74) *Attorney, Agent, or Firm* — Ostrolenk Faber LLP

(57) ABSTRACT

A cigar lighter has a heating element and a movable knob biased by a spring. The heating element has a first electrical terminal in contact with a first contact element disposed around the perimeter of the heating element and a second centrally located terminal in contact with a centrally disposed fastener. A bimetal element is in contact with the second terminal of the heating element and has two engaging clips. A movable contact moves with the knob and has a first position wherein it does not engage the clips and the heating element is unenergized and a second position wherein it engages the clips to energize the heating element.

40 Claims, 33 Drawing Sheets

(56) References Cited

U.S. PATENT DOCUMENTS

| | | | |
|---|---|---|---|
| 5,144,111 | A | 9/1992 | Von Gaisberg et al. |
| 5,649,840 | A | 7/1997 | Muto |
| 5,775,952 | A | 7/1998 | Lu |
| 5,932,126 | A * | 8/1999 | Thivet .................... 219/265 |
| 6,476,359 | B2 | 11/2002 | Rostan |
| 6,682,356 | B2 | 1/2004 | Erez et al. |
| 6,740,850 | B2 | 5/2004 | Mattis |
| 7,060,938 | B1 | 6/2006 | Lauer |
| 7,193,182 | B2 | 3/2007 | Can et al. |
| 2002/0020694 | A1 | 2/2002 | Rostan |
| 2003/0209531 | A1 * | 11/2003 | Mattis .................... 219/265 |
| 2005/0082270 | A1 | 4/2005 | Can et al. |
| 2005/0153602 | A1 * | 7/2005 | Belanger, Jr. .............. 439/668 |

FOREIGN PATENT DOCUMENTS

| | | |
|---|---|---|
| GB | 2 092 287 A | 8/1982 |
| JP | 58066719 A | 4/1983 |
| JP | 06181081 A | 6/1994 |
| JP | 9-22757 | 1/1997 |
| JP | 10326648 | 12/1998 |
| JP | 2005-524818 | 8/2005 |
| JP | 2014 0525996 | 6/2013 |
| KR | 10-2005-0006231 | 1/2005 |
| WO | WO-2011/090277 | 7/1982 |
| WO | WO 03/095898 A1 | 11/2003 |

OTHER PUBLICATIONS

Japanese Office Action dated Feb. 9, 2015 in related Japanese Patent Application No. 2014-525996.
English translation of Japanese Office Action dated Feb. 9, 2015 in related Japanese Patent Application No. 2014-525996.
Supplemental European Search Report and European Search Opinion issued Mar. 5, 2015 in related European Patent Application No. 12825760.7.
European Search Report issued Apr. 1, 2015 in related European Patent Application No. 12825833.2.
Japanese Office Action dated Apr. 20, 2015 in related Japanese Patent Application No. 2014-525997.
English translation of Japanese Office Action dated Apr. 20, 2015 in related Japanese Patent Application No. 2014-525997.
Korean Office Action dated Apr. 23, 2015 in related Korean Patent Application No. 10-2014-7007333.
English translation of Korean Office Action dated Apr. 23, 2015 in related Korean Patent Application No. 10-2014-7007333.

* cited by examiner

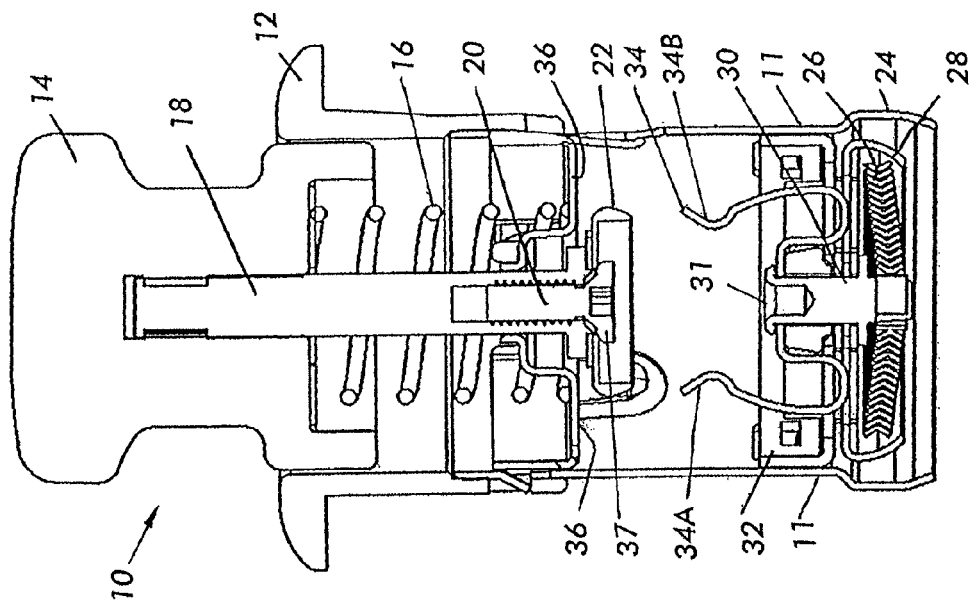
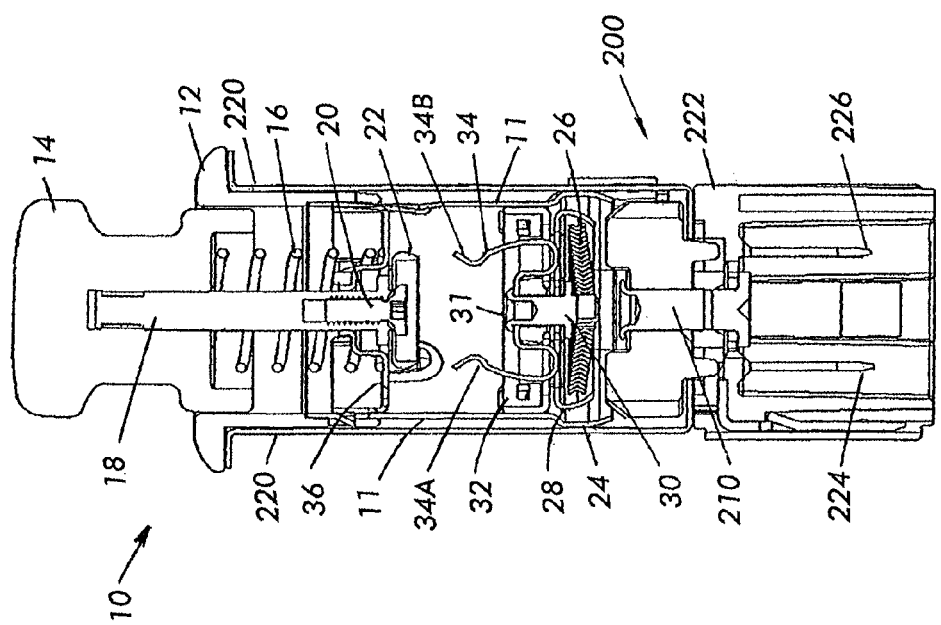

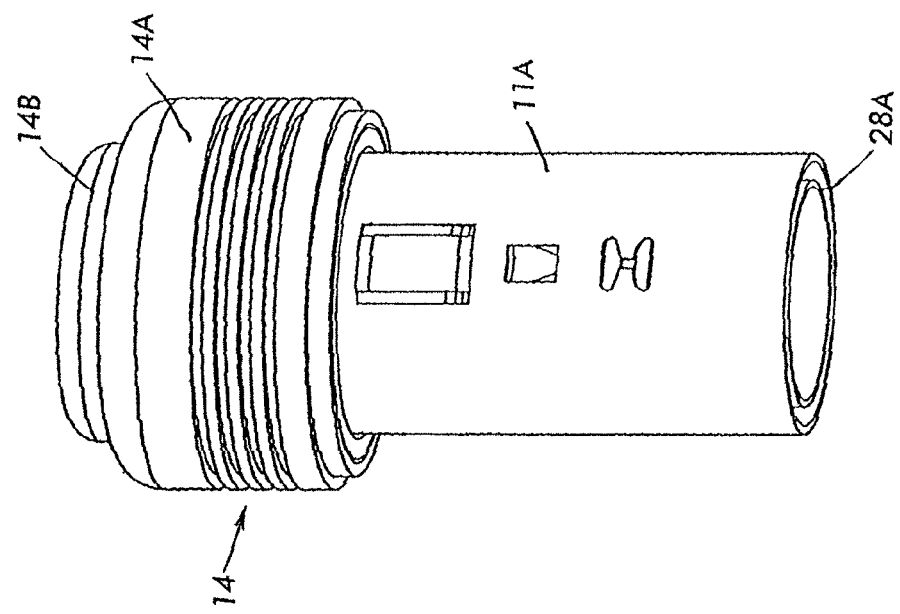
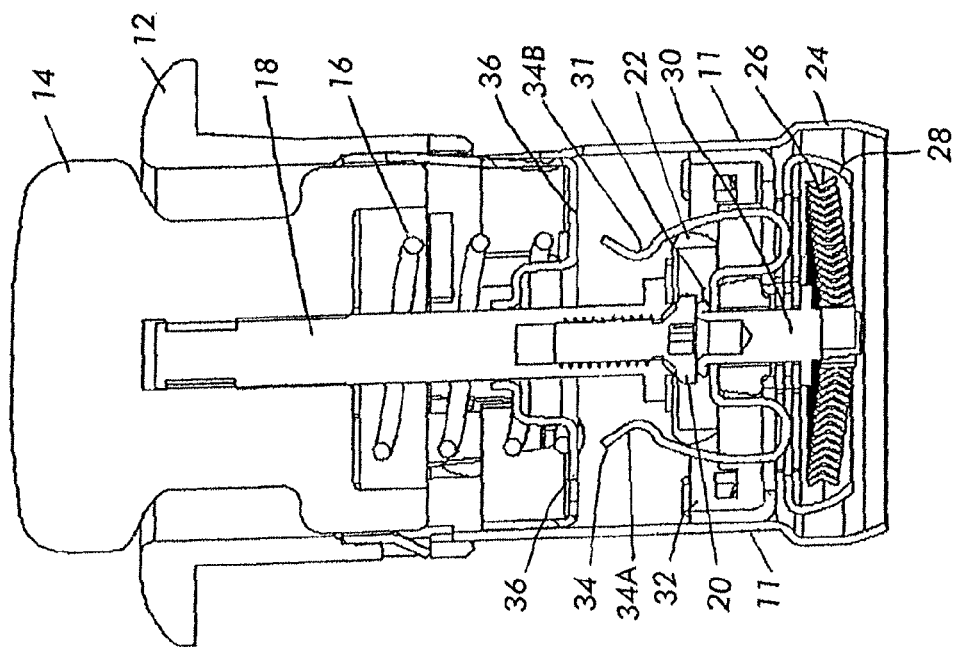
FIG. 4
FIG. 3A

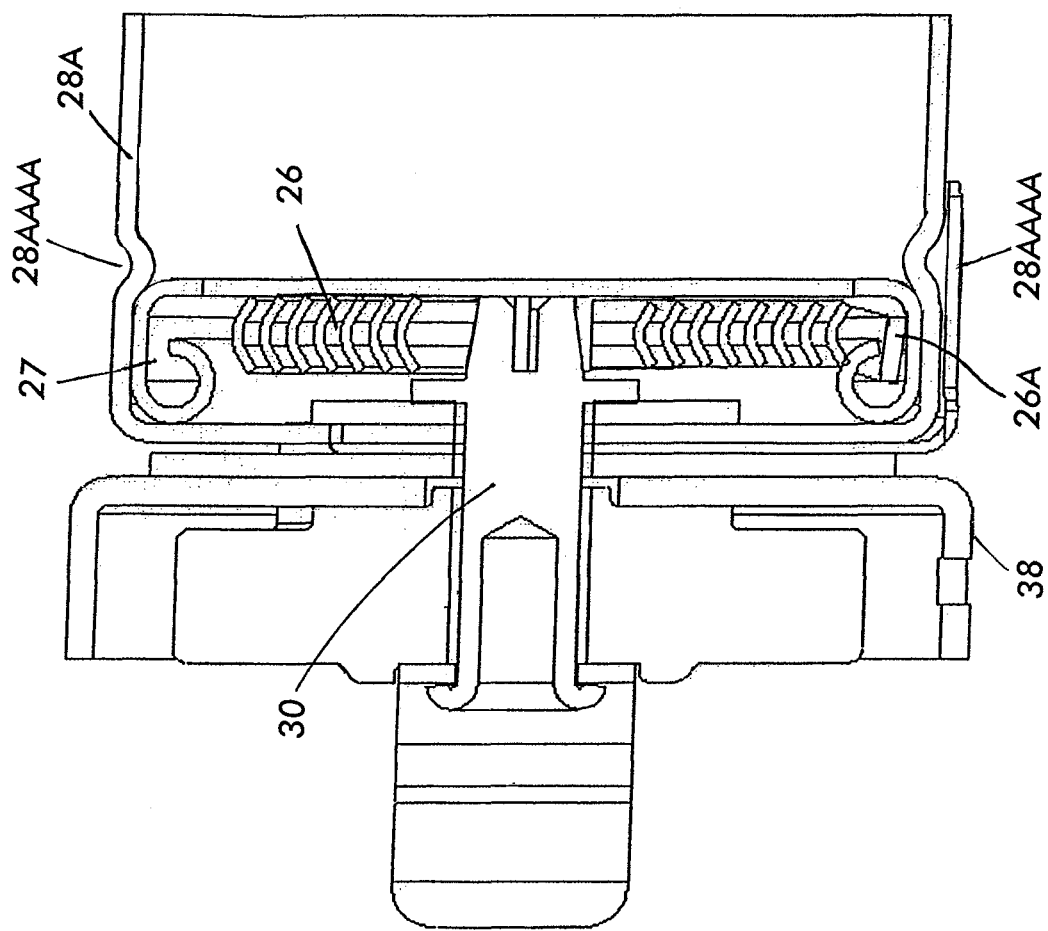

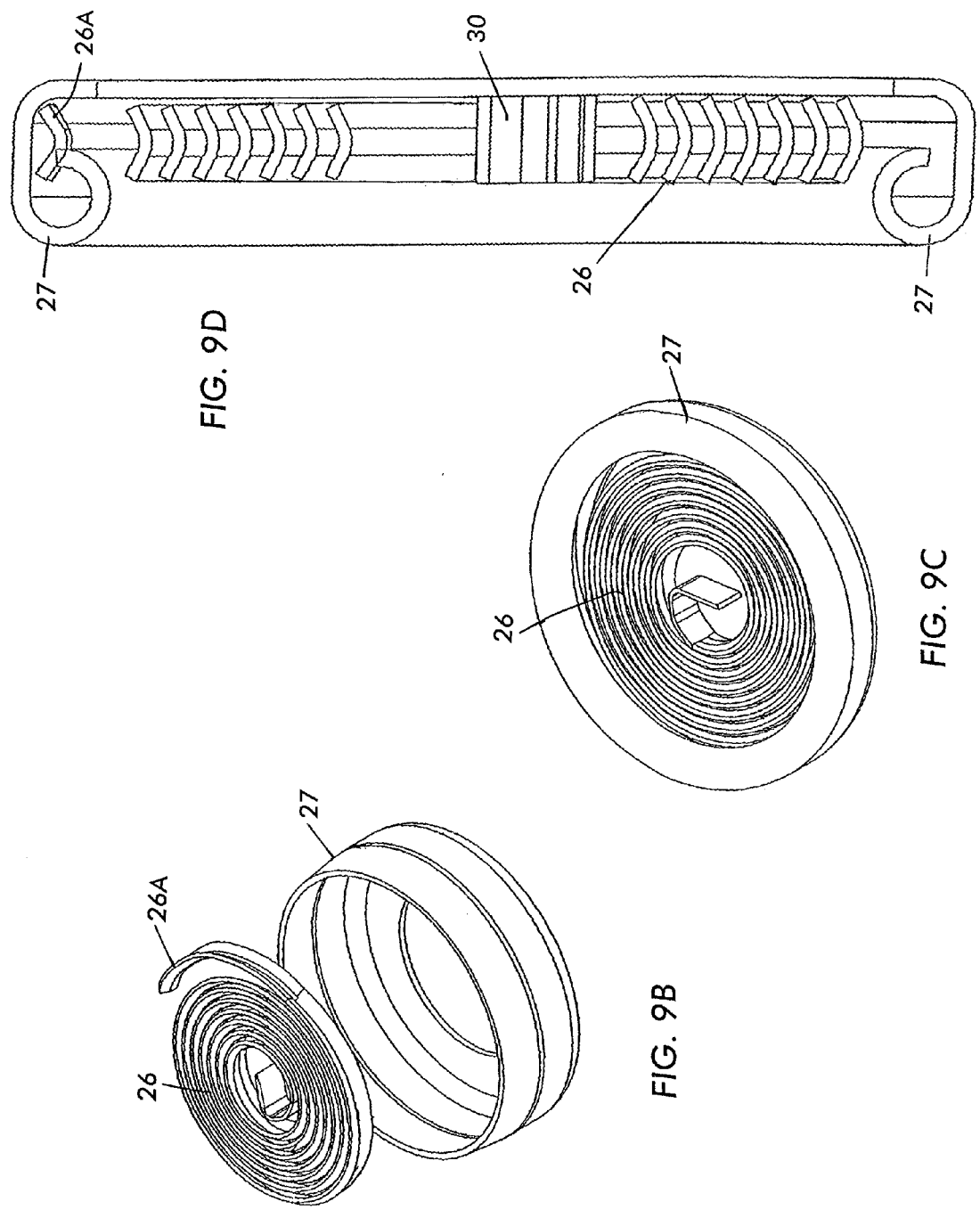

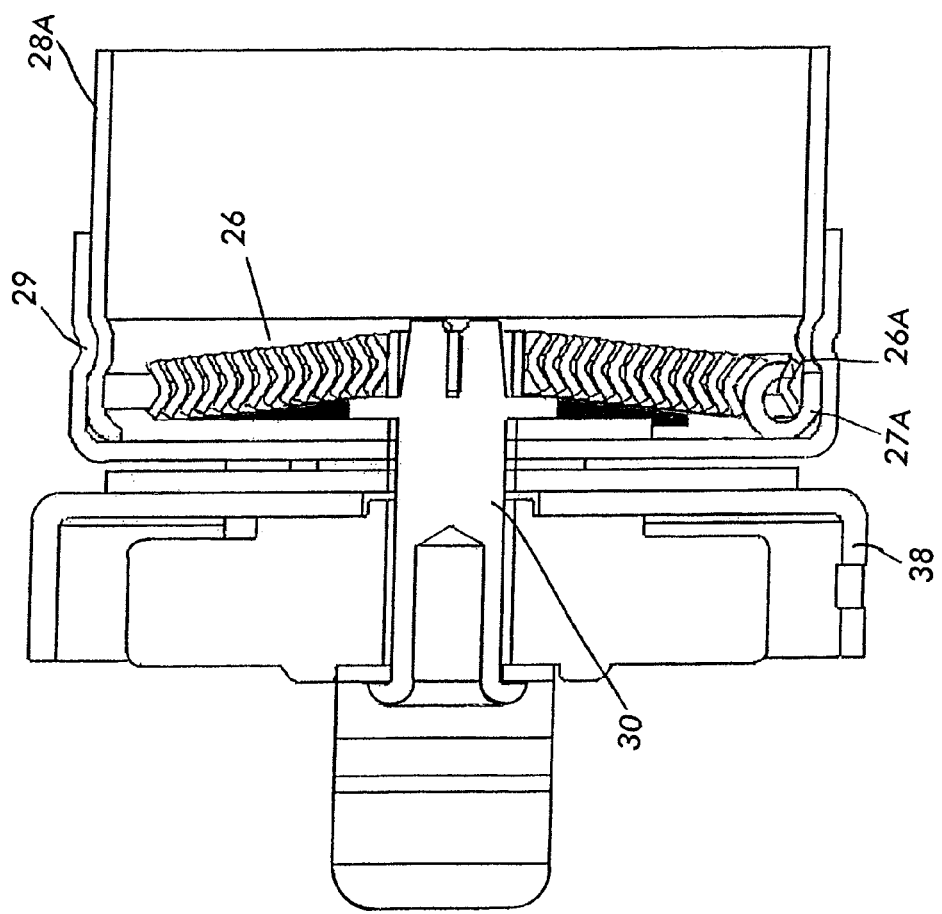

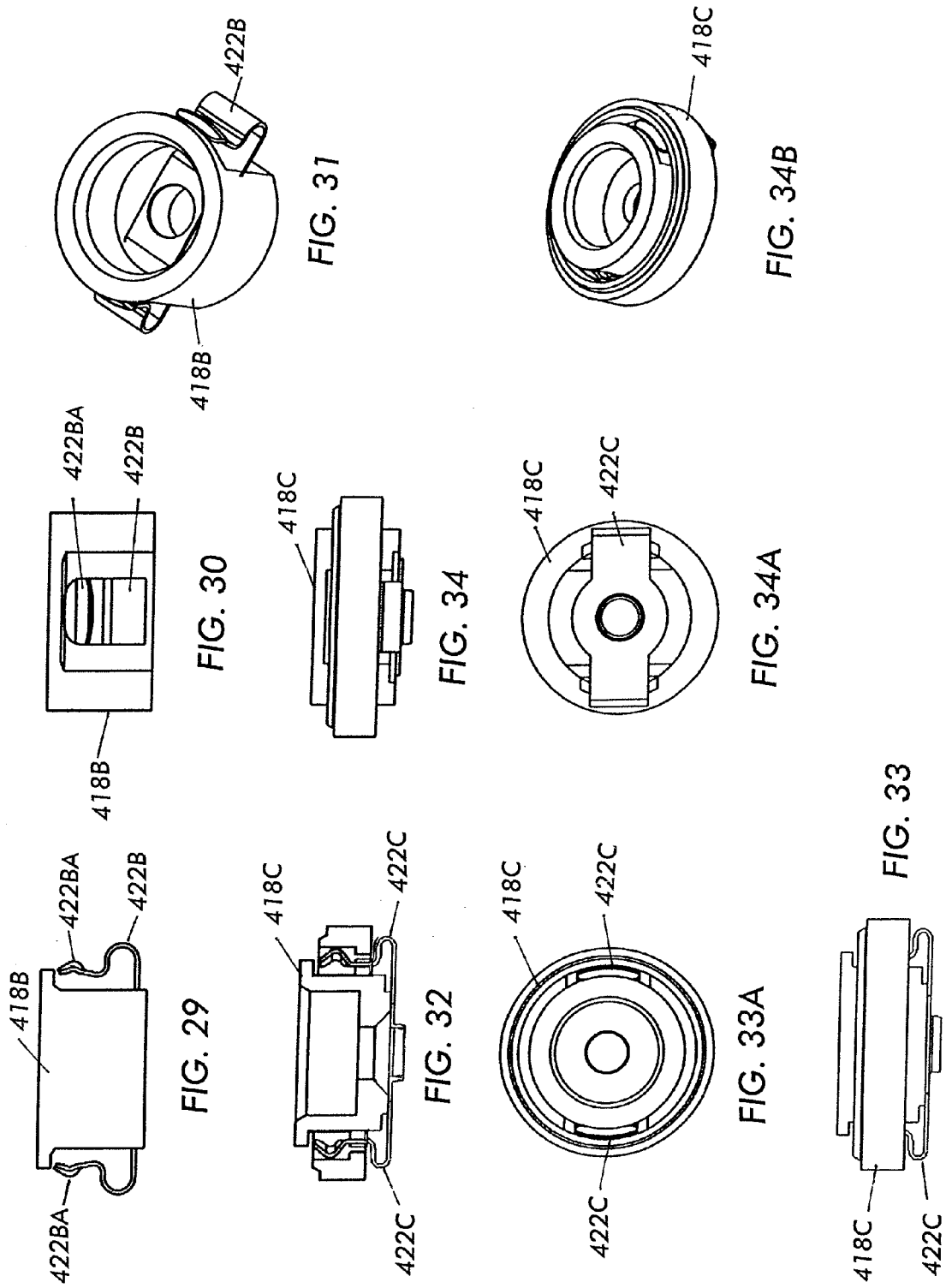

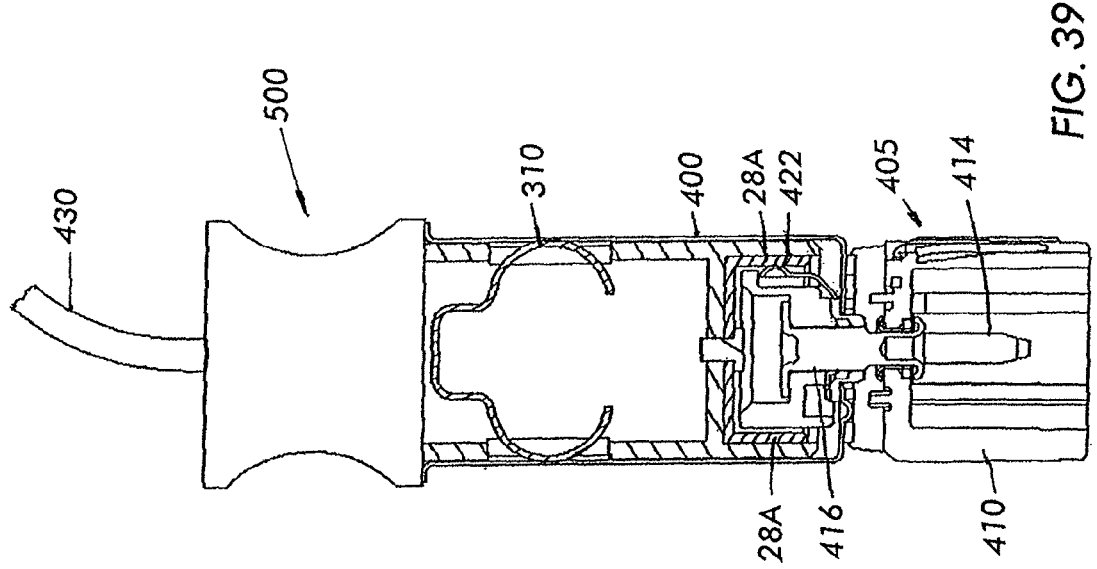

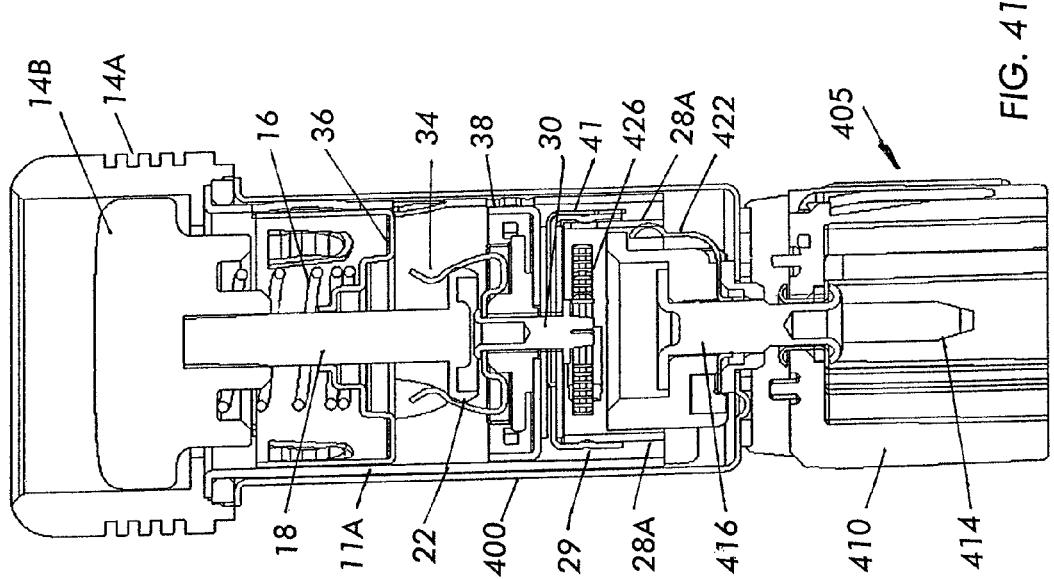
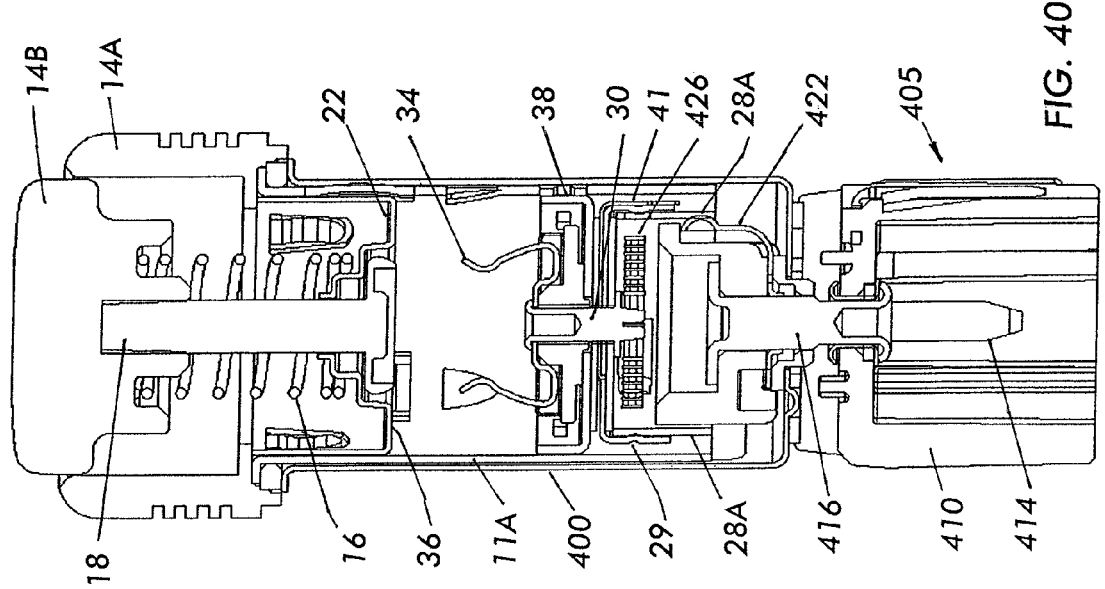

ELECTRIC CIGAR LIGHTER, UNIVERSAL POWER SOCKET AND ACCESSORY PLUG

BACKGROUND OF THE INVENTION

The present invention relates to electric cigar lighters, for example, for automotive vehicles, as well as a universal electrical power socket, for example, for vehicles, to allow electrically powered devices to be powered from the universal electrical socket. The electrical socket furthermore allows the electric cigar lighter of the present invention to be employed therewith. Moreover, the invention relates to an accessory electrical plug which can be employed with the universal electrical socket.

Modern vehicles are increasingly being supplied in standard form without cigarette/cigar lighters in an effort to reduce the smoking habit. Furthermore, modern vehicles are increasingly being supplied with electrical power sockets for powering modern electronic devices, for example, chargers for electronic devices, computers, video players, and various other forms of electronic equipment.

In the past, when cigar lighters were standard equipment in vehicles, the lighter was plugged into a vehicle electrical socket. The electrical socket typically included a bimetallic element which the cigar lighter, when inserted, engaged to energize the lighter, and which deenergized the cigar lighter when it reached operating temperature. By placing the bimetallic element in the socket, the lighter could be made simpler, essentially comprising a knob, heating element and spring with necessary electrical and thermal insulating elements.

Now that vehicles are not being supplied with lighters as standard equipment, the electrical sockets in the vehicles no longer come equipped with the bimetallic disengaging elements. Accordingly, the bimetallic elements have been moved to the lighter unit itself. See for example U.S. Pat. No. 6,740,850 to Mattis and European Patent Application No. 09004224.3.

These designs, however, suffer from disadvantages relating to achieving adequate electrical contact at the high currents involved and relating to providing adequate thermal protection of the knob and adequate heat transfer to the bimetallic element to enable reliable operation.

Furthermore, because the bimetallic element is no longer located in the socket, it is desirable to provide an improved electrical socket which provides improved electrical contact for powering both lighters as well as portable electric/electronic equipment but yet which still allows the prior art plugs employed with prior art sockets to be used.

Furthermore, it is desirable to provide an improved accessory electrical plug which can be plugged into the socket to power electrical/electronic devices.

SUMMARY OF THE INVENTION

The invention addresses the above problems.

According to one aspect, the invention comprises a cigar lighter adapted to be received in an electrical socket for energizing a heating element of the cigar lighter comprising an electrically conductive body shell adapted to make electrical and mechanical contact with a sleeve of the socket; a user actuatable knob received in the body shell for telescopic movement therein against the bias of a compression spring; an electrical heating element disposed at a distal end of the body shell, the electrical heating element having a first electrical terminal in electrical contact with a first electrical contact element disposed around the perimeter of the electrical heating element and adapted to make electrical contact with a first electrical contact of the electrical socket; the electrical heating element having a second electrical terminal substantially centrally located with respect to the body shell, the second electrical terminal in electrical contact with a centrally disposed fastener; a first bimetal element held in position by the fastener electrically insulated from the body shell and being in electrical communication with the second terminal of the heating element, the bimetal element including at least two proximally extending engaging clips; a movable electrical contact arranged for movement with the user actuatable knob, the movable electrical contact being in electrical communication with the body shell, the movable electrical contact having first and second positions whereby, in a first position, when the knob extends proximally, the movable electrical contact is not in electrical engagement with the bimetal engaging clips so that the heating element is not energized and wherein, in a second position, when the knob is moved distally, the movable electrical contact engages with and is held in position by said bimetal engaging clips to energize the heating element with electrical power until a first predetermined temperature is reached at which said bimetal clips flex to release said movable electrical contact from said bimetal engaging clips to de-energize said heating element and allowing said knob to move proximally due to the bias of said spring.

According to another aspect, the invention comprises an electrical socket for powering an electrical/electronic accessory device having an electrical plug that is received in the socket, comprising an electrically conductive socket well for slidably receiving the electrical plug of the electrical/electronic device; an electrical connector portion disposed distally on the socket well and comprising an insulator fastened to the socket well at a distal end thereof and having at least two electrical terminals for connecting to a vehicle electrical power source; a plurality of first electrical contacts disposed at a distal end of said socket well and extending radially and proximally from the center of said well and being electrically connected to a first of said electrical terminals of said electrical connector portion; a second of said electrical terminals of said electrical connector portion being electrically connected to said socket well; and said plurality of first electrical contacts being adapted to electrically slidably engage with an inner periphery of a hollow cylindrical electrical contact of said electrical plug.

According to yet another aspect, the invention comprises an electrical accessory plug comprising a plug body having a housing including at least one spring loaded radially directed electrical contact for slidably electrically engaging with an electrically conductive well of an electrical socket; and a distally disposed contact insulated from said housing and comprising an electrically conductive cylinder adapted to make sliding contact on an inner peripheral surface thereof with a radially directed contact disposed in insulated fashion in the well of said electrical socket.

According to another aspect, the invention comprises a heating assembly for a cigar lighter comprising a cylindrical body having an electrical heating element having a first electrical terminal in electrical contact with the cylindrical body, the cylindrical body being disposed around the perimeter of the electrical heating element and adapted to make electrical contact with a first electrical contact of an electrical socket; the electrical heating element having a second electrical terminal substantially centrally located with respect to the cylindrical body, the second electrical terminal in electrical contact with a centrally disposed fastener; further wherein the heating element is in the shape of a spiral having the first electrical terminal disposed on the outside of said spiral, said first electrical terminal being received through a slot in said cylindrical body thereby electrically engaging with said cylindrical body, the second electrical terminal being disposed at the inside of said spiral and being in electrical engagement with said centrally disposed fastener, further comprising a concentric cap disposed outside said cylindrical body surrounding at least a part of said cylindrical body and fixing said first electrical terminal of said heating element between said cap and an outer periphery of said cylindrical body.

According to still another aspect, the invention comprises a cigar lighter adapted to be received in an electrical socket for energizing a heating element of the cigar lighter, comprising an electrically conductive body shell adapted to make electrical and mechanical contact with a sleeve of the socket; a user actuatable knob attached to the body shell for movement against the bias of a compression spring; an electrical heating element disposed at a distal end of the body shell, the electrical heating element having a first electrical terminal in electrical contact with a first electrical contact element disposed around the perimeter of the electrical heating element and adapted to make electrical contact with a first electrical contact of the electrical socket, the electrical heating element being controlled to reach a first predetermined temperature to allow ignition of a cigar or cigarette; the electrical heating element having a second electrical terminal substantially centrally located with respect to the body shell, the second electrical terminal in electrical contact with a centrally disposed fastener; further comprising a thermal protection bimetal element in electrical communication with said first electrical contact element for electrically contacting either said body shell or a part in electrical communication with said body shell in the event the temperature of said heating element reaches a second predefined temperature higher than said first predetermined temperature to avert a safety hazard.

According to still yet another aspect, the invention comprises a cigar lighter adapted to be received in an electrical socket for energizing a heating element of the cigar lighter, comprising an electrically conductive body shell adapted to make electrical and mechanical contact with a sleeve of the socket; a user actuatable knob received in the body shell for telescopic movement therein against the bias of a compression spring; an electrical heating element disposed at a distal end of the body shell, the electrical heating element having a first electrical terminal in electrical contact with a first electrical contact element disposed around the perimeter of the electrical heating element and adapted to make electrical contact with a first electrical contact of the electrical socket; the electrical heating element having a second electrical terminal substantially centrally located with respect to the body shell, the second electrical terminal in electrical contact with a centrally disposed fastener; a first bimetal element held in position by the fastener electrically insulated from the body shell and being in electrical communication with the second terminal of the heating element, the bimetal element having a proximally extending engaging element; a movable electrical contact arranged for movement with the user actuatable knob, the movable electrical contact being in electrical communication with the body shell, the movable electrical contact having first and second positions whereby, in a first position, when the knob extends proximally, the movable electrical contact is not in electrical engagement with the bimetal engaging element so that the heating element is not energized and wherein, in a second position, when the knob is moved distally, the movable electrical contact engages with and is held in position by said bimetal engaging element to energize the heating element with electrical power until a first predetermined temperature is reached at which said bimetal engaging element flexes to release said movable electrical contact from said bimetal engaging element to de-energize said heating element and allowing said knob to move proximally due to the bias of said spring, further wherein said movable electrical contact can be held in electrical engagement with a proximally directed head of said centrally disposed fastener by pressing said user actuatable knob distally to maintain electrical current flow to said heating element even if said first bimetal element has released the movable electrical contact.

According to yet still another embodiment, the invention comprises a cigar lighter adapted to be received in an electrical socket for energizing a heating element of the cigar lighter, comprising an electrically conductive body shell adapted to make electrical and mechanical contact with a sleeve of the socket; a user actuatable knob attached to the body shell for movement against the bias of a compression spring; an electrical heating element disposed at a distal end of the body shell, the electrical heating element having a first electrical terminal in electrical contact with a first electrical contact element disposed around the perimeter of the electrical heating element and adapted to make electrical contact with a first electrical contact of the electrical socket; the electrical heating element having a second electrical terminal substantially centrally located with respect to the body shell, the second electrical terminal in electrical contact with a centrally disposed fastener; further wherein the first electrical contact element comprises a cylindrical contact element surrounding the electrical heating element; further wherein the heating element is in the shape of a spiral having the first electrical terminal disposed on the outside of said spiral, further wherein the first electrical terminal of the heating element is secured electrically and mechanically to a coil retainer that surrounds the heating element; wherein the coil retainer is rolled over to secure the first electrical terminal in a region of the perimeter of the coil retainer comprising only a portion of the perimeter of the coil retainer.

BRIEF DESCRIPTION OF THE DRAWING(S)

The invention will be described in greater detail in the following detailed description with reference to the drawings in which:

FIG. 1 shows a cut-away view of a first embodiment of the cigar lighter according to the present invention inserted into an electrical socket, with the cigar lighter in a stand-by, deenergized position;

FIG. 2 shows a cut-away view of the cigar lighter in the stand-by position (socket not shown);

FIG. 3A shows the cigar lighter of FIG. 3 when the "relite" feature is being employed;

FIG. 4 shows a perspective view of a second embodiment of the cigar lighter;

Figure 9:
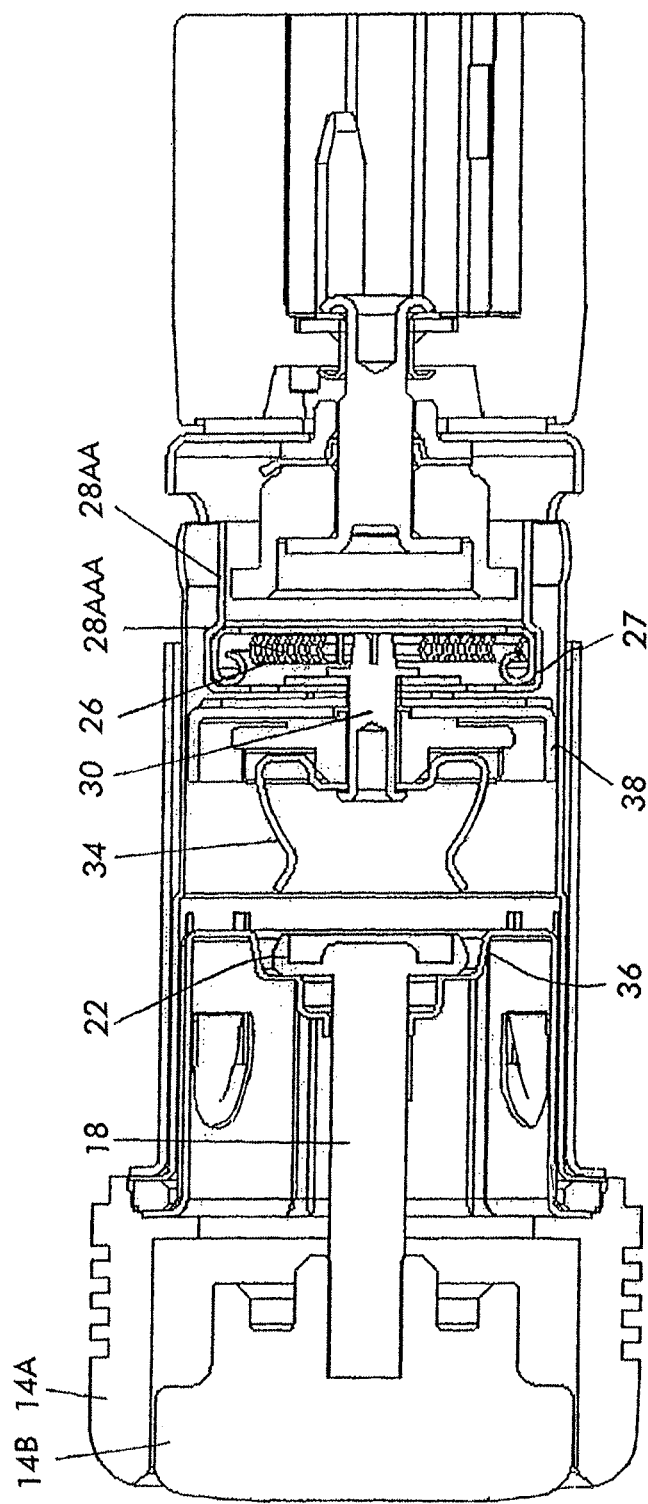
FIG. 9 shows a cigar lighter according to the invention employing an alternative embodiment of the heating element assembly and coil retainer.
Figure 9A:
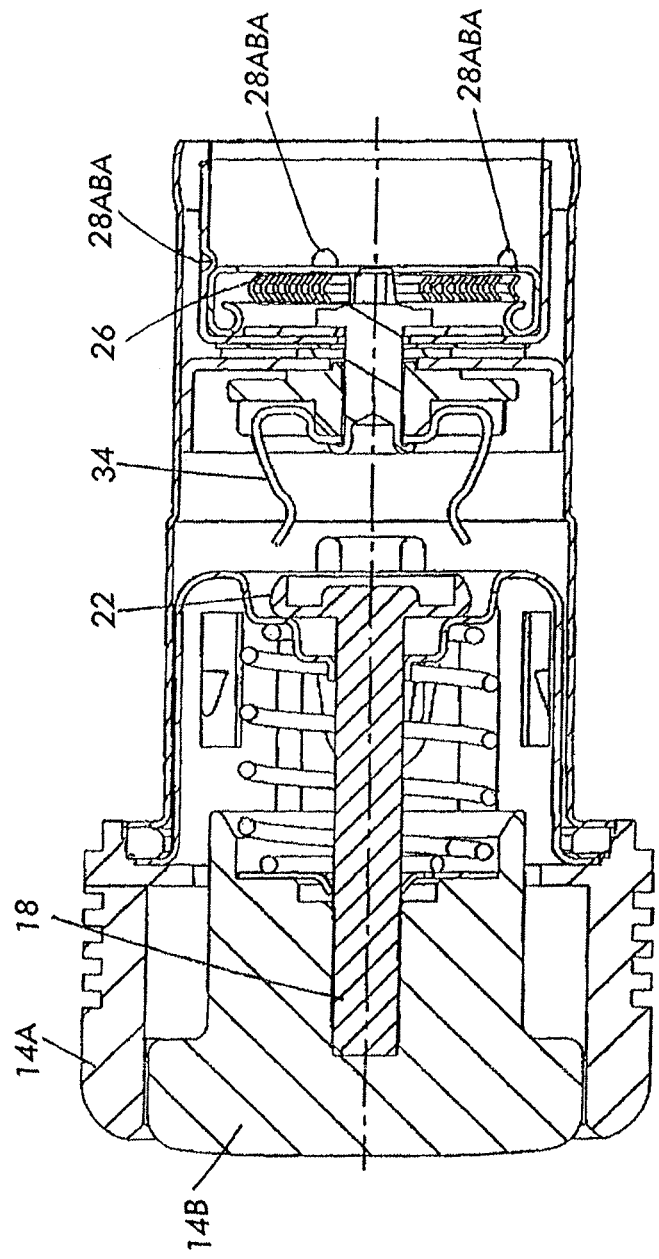
FIG. 9A shows details of the embodiment of FIG. 9.
Figure 10:
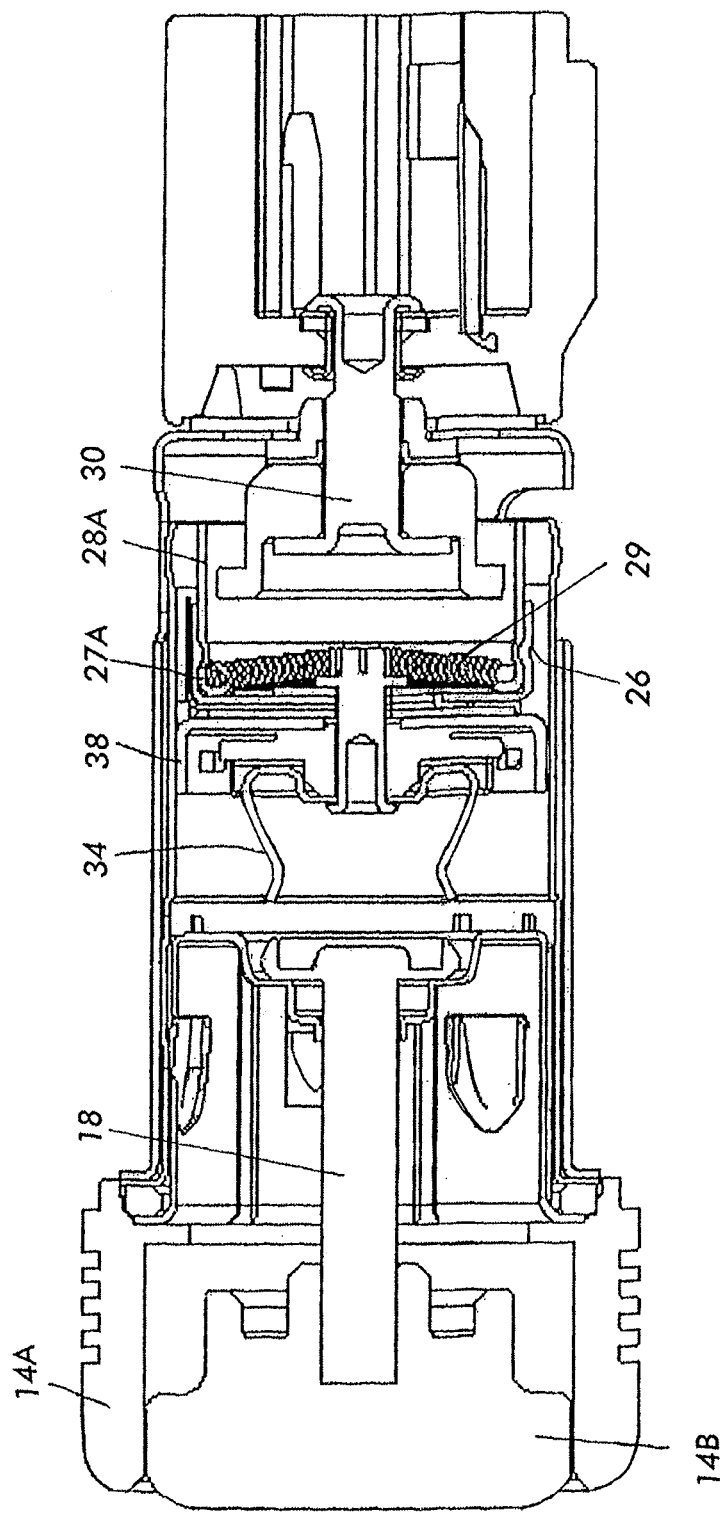
Figure 10A:
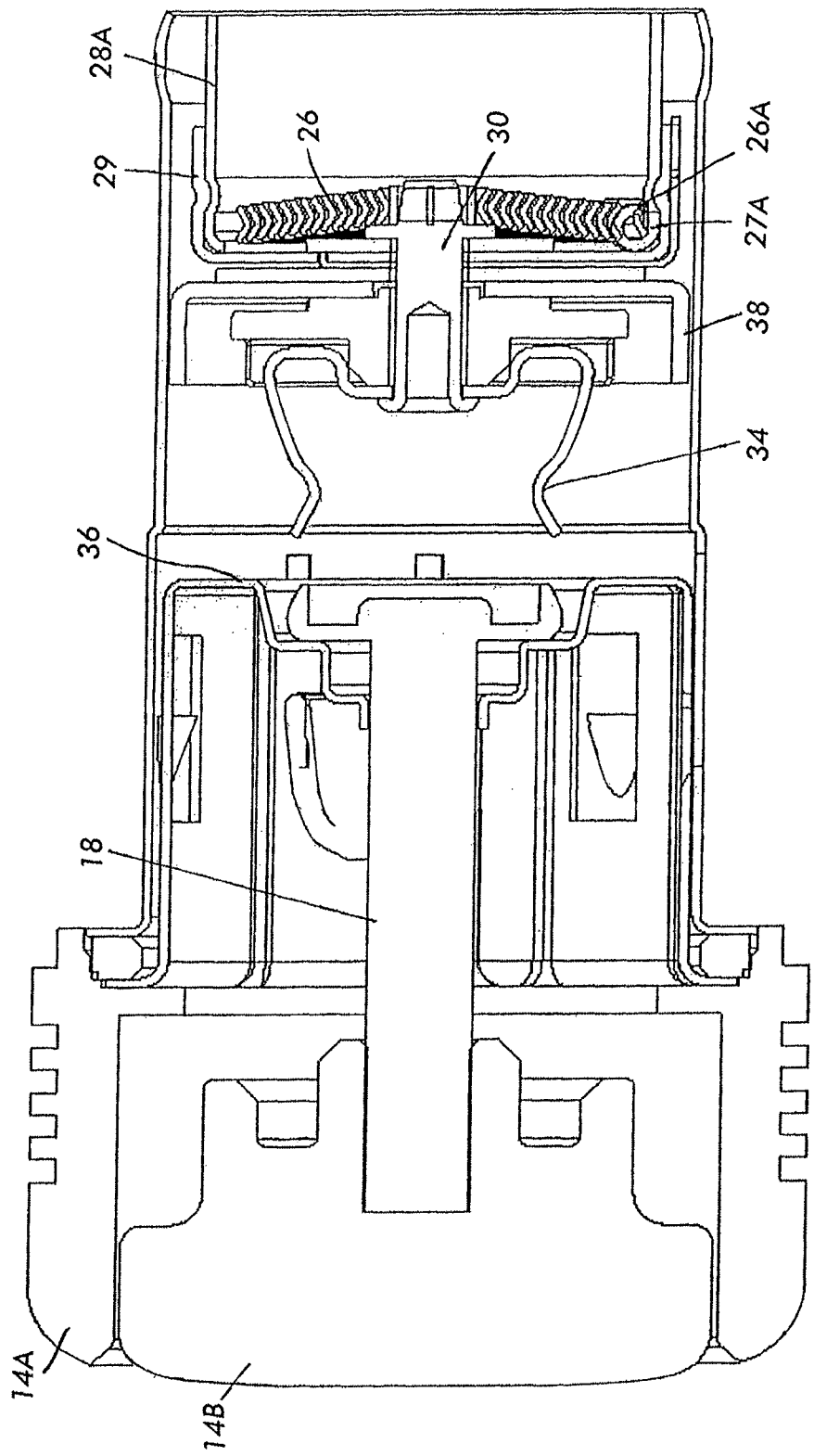

FIG. 9AA shows a modified embodiment of FIG. 9;

FIGS. 9B-9K show details of the assembly process for the embodiment of FIG. 9;

FIG. 10 shows a cigar lighter according to the invention employing another alternative embodiment of the heating element assembly and coil retainer;

FIG. 10A shows details of the embodiment of FIG. 10;

FIG. 10AA shows details of FIG. 10A.

Figure 8:
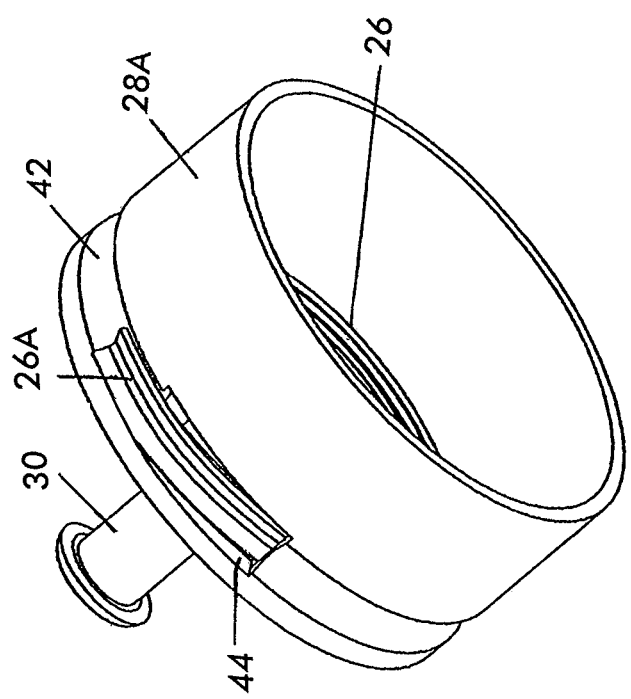
FIG. 8 shows a portion of the heating element assembly showing details of the heating coil retainer/contact.
Figure 11:
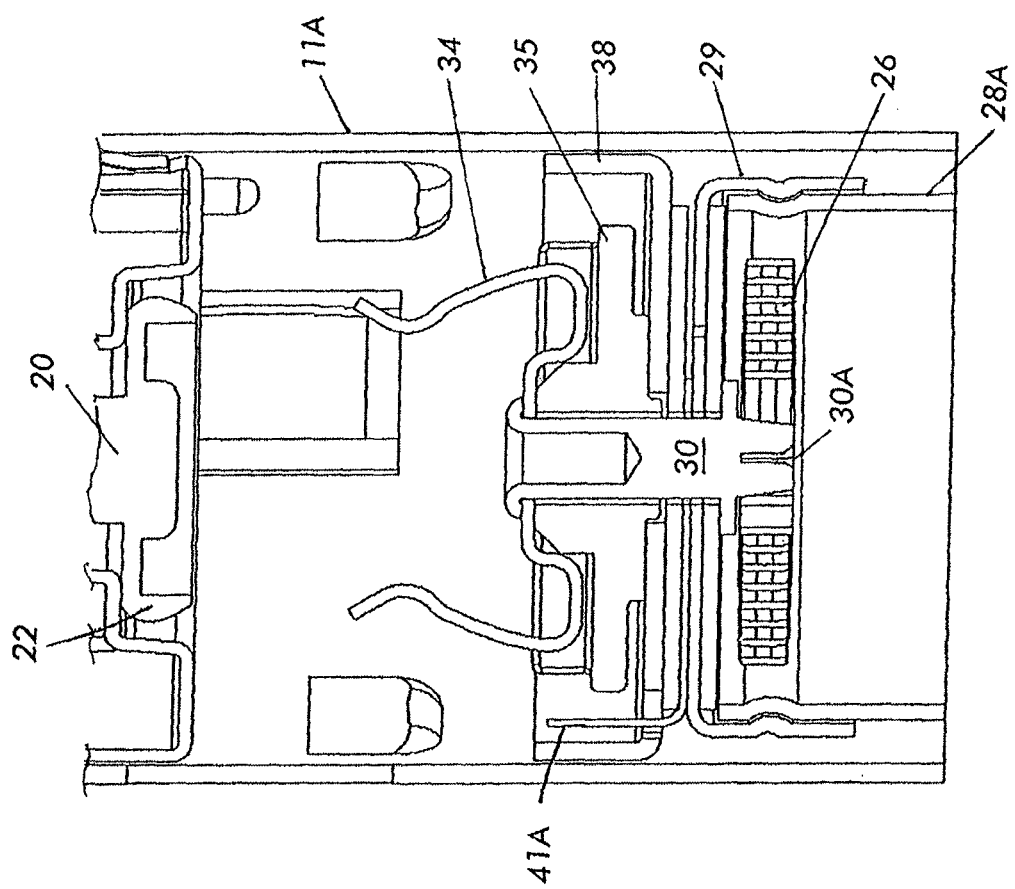
Figure 12:
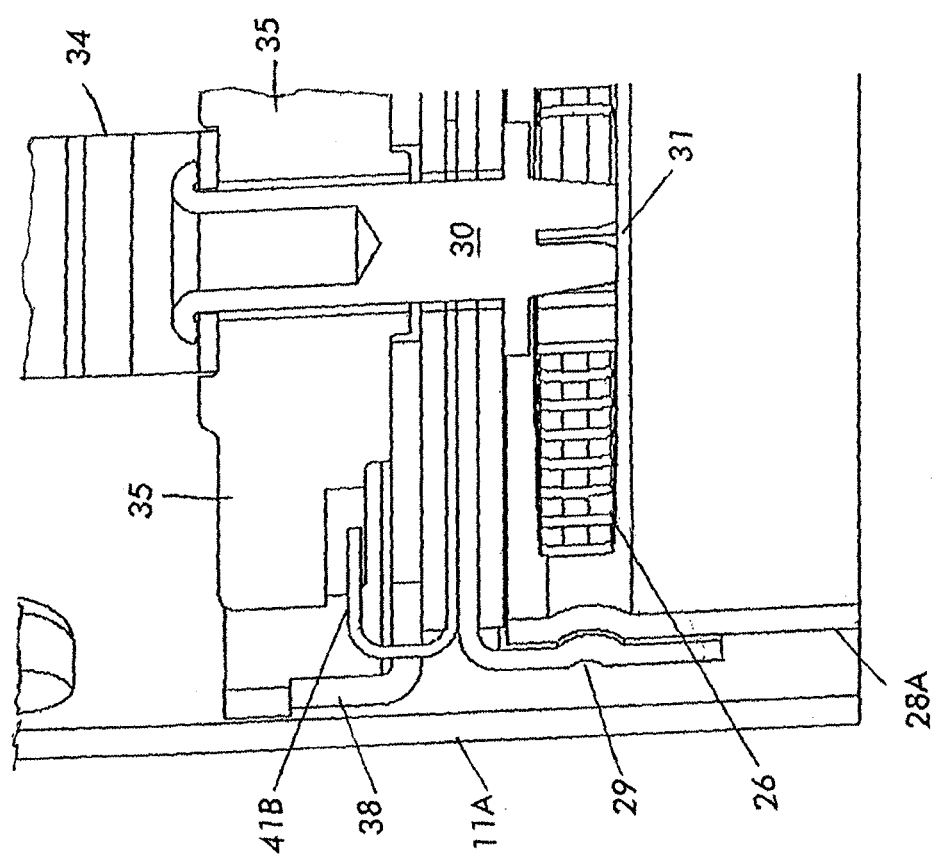
Figure 13:
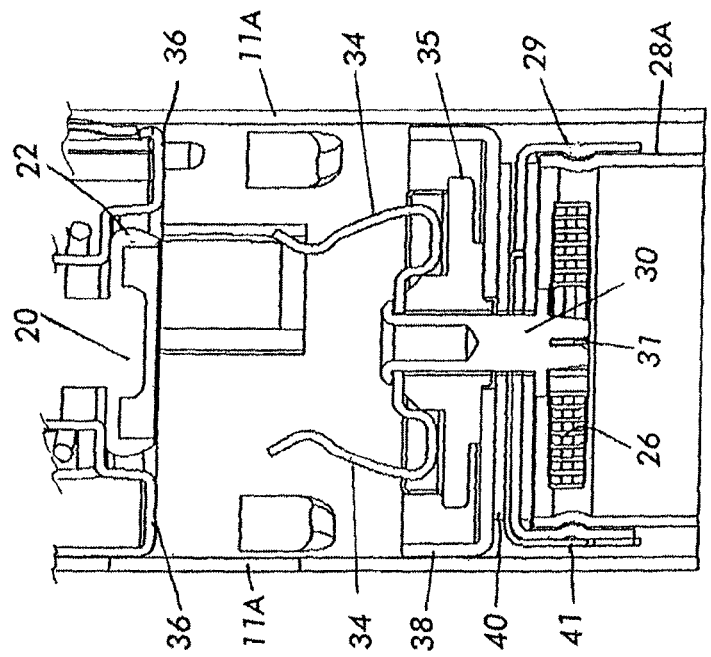
Figure 13B:
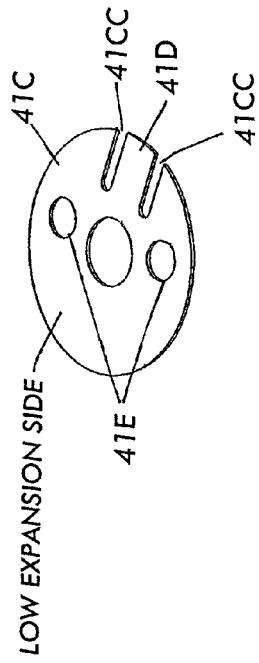
Figure 13C:
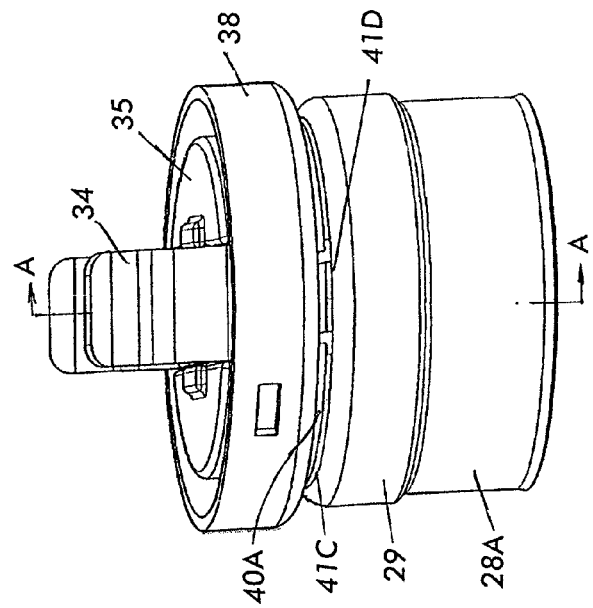
Figure 13A:
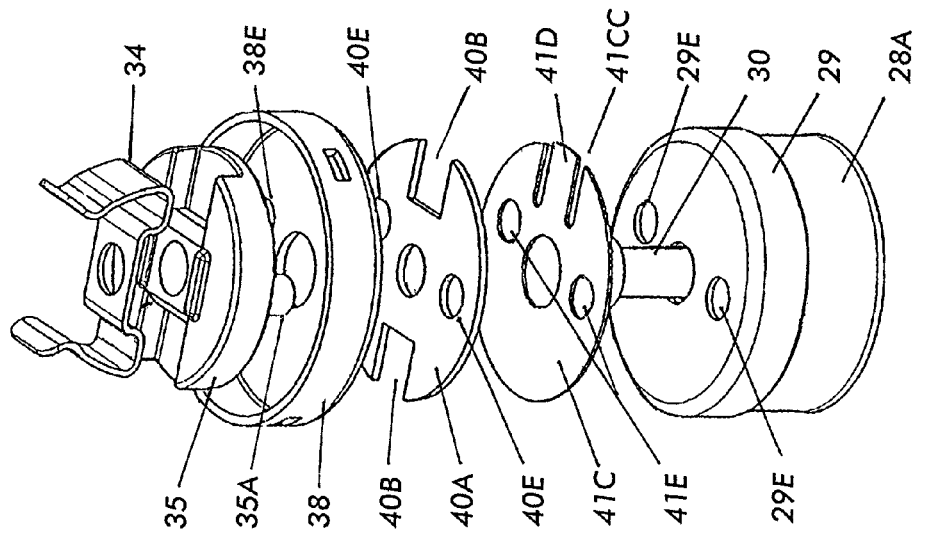

FIGS. 10B-10H show details of the assembly process for the embodiment of FIG. 10;

FIG. 11 shows the heating element assembly of FIG. 8 and showing one form of a thermal protection element;

FIG. 12 shows the heating element assembly of FIG. 8 showing an alternative embodiment of the thermal protection element;

FIG. 13 shows yet another alternative embodiment of the thermal protection element;

FIG. 13A shows another alternative embodiment of the thermal protection element;

FIG. 13B shows the bimetal thermal protection disc of FIG. 13A.

Figure 13E:
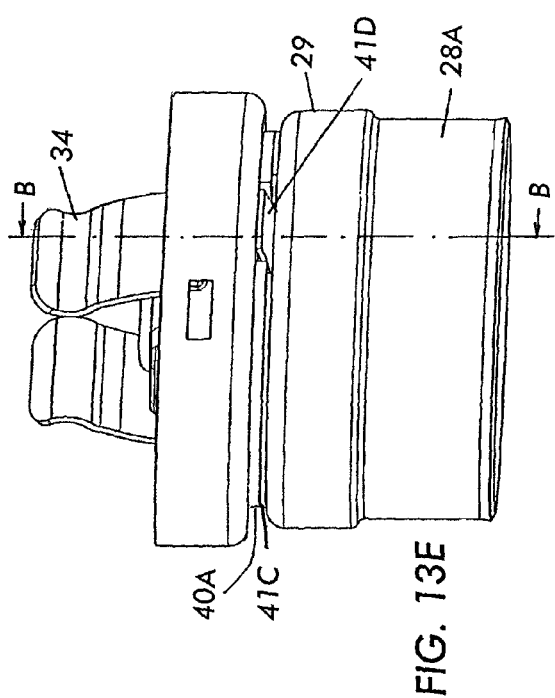
Figure 13F:
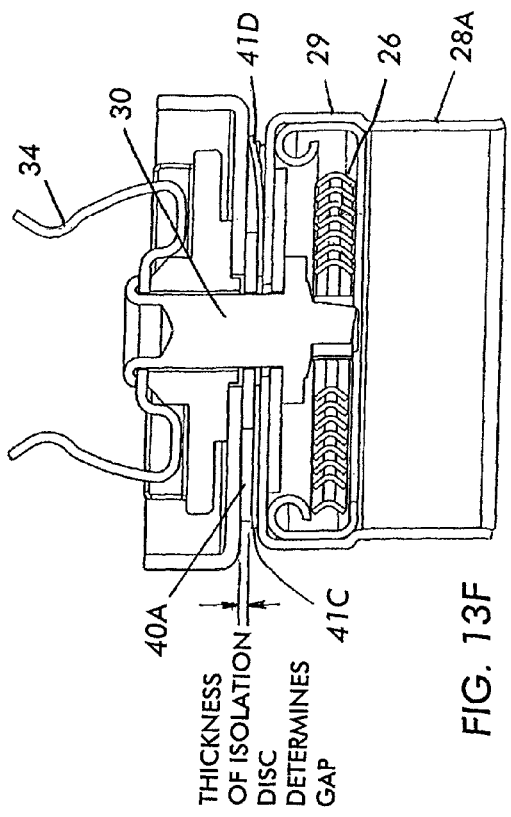
Figure 13D:
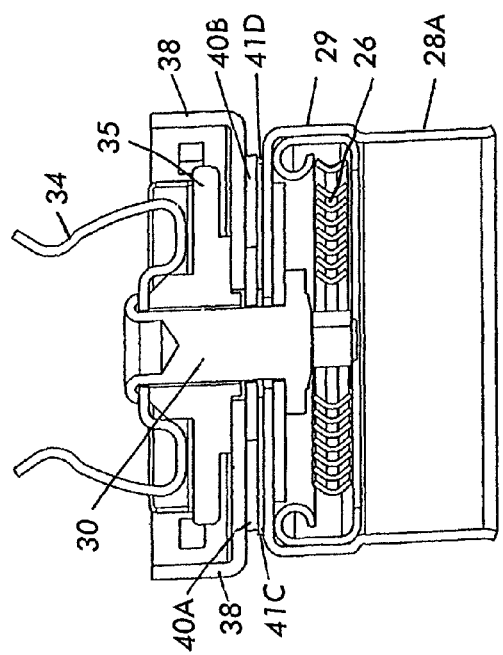

FIG. 13C shows the heating element and unactivated bimetal thermal protection disc;

FIG. 13D is a cross section along line A-A of FIG. 13C;

FIG. 13E shows the heating element with the bimetal thermal protection disc in an activated state;

FIG. 13F is a cross section along line B-B through a center plane of the heating element of FIG. 13E.

Figure 14:
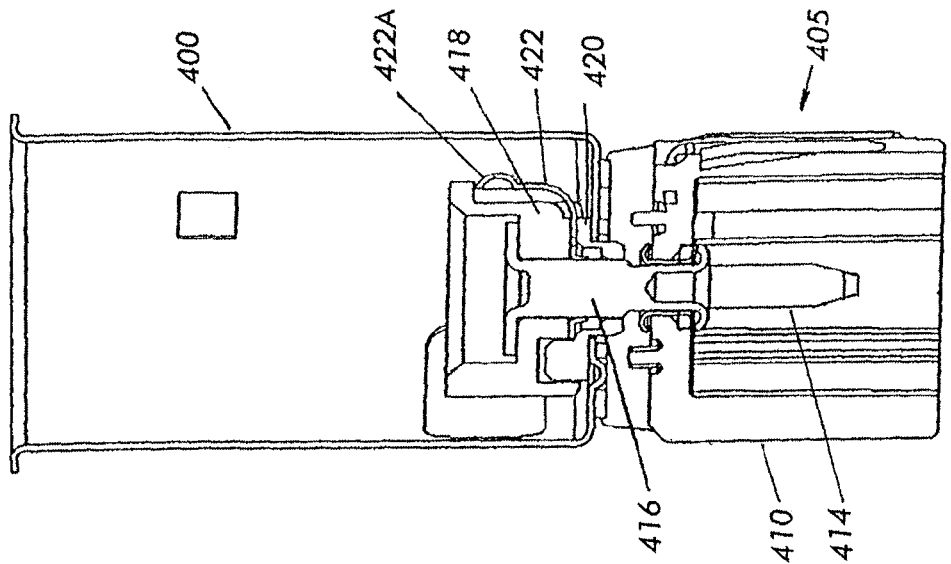
Figure 17:
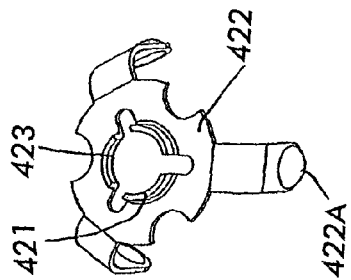
Figure 16:
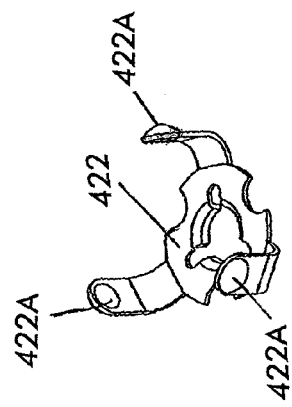
Figure 15:
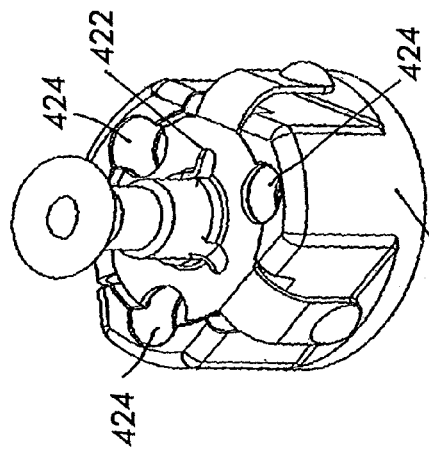
Figure 19:
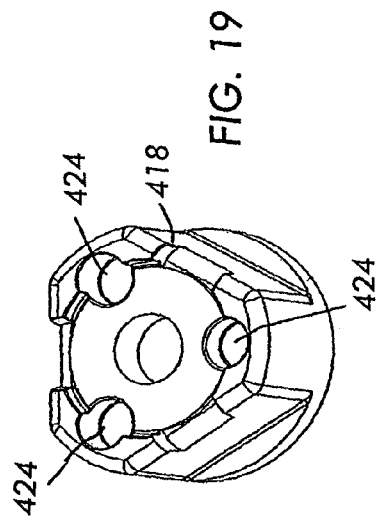
Figure 18:
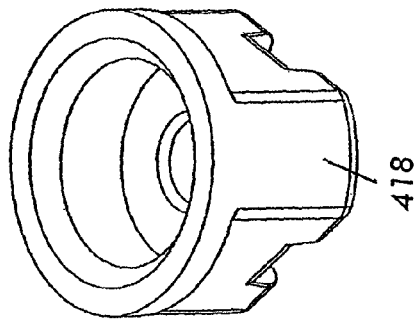
Figure 22:
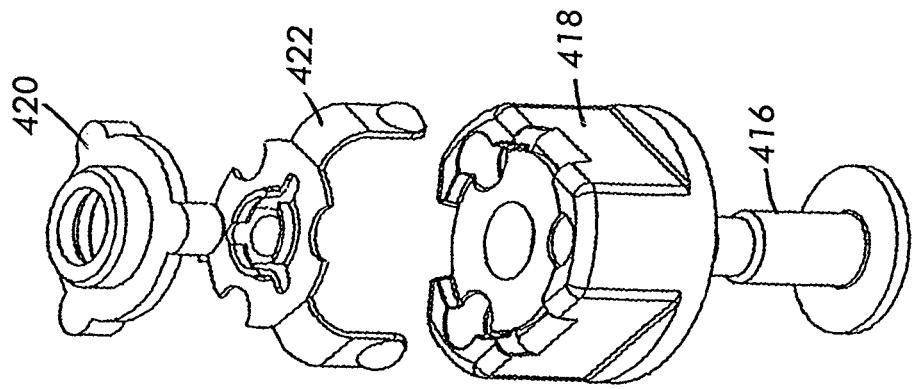
Figure 21:
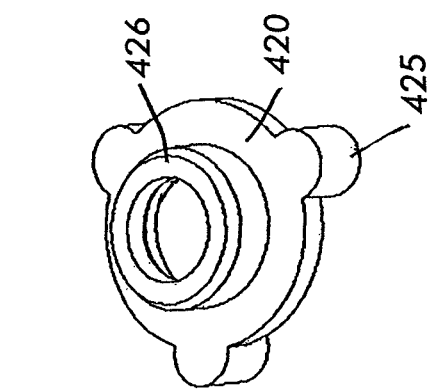
Figure 23:
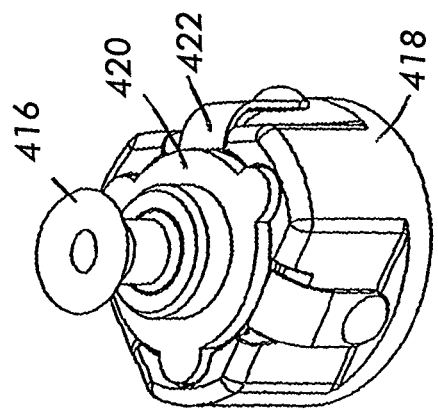
Figure 20:
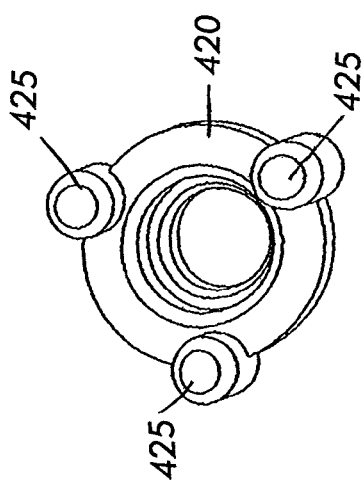
Figure 25:
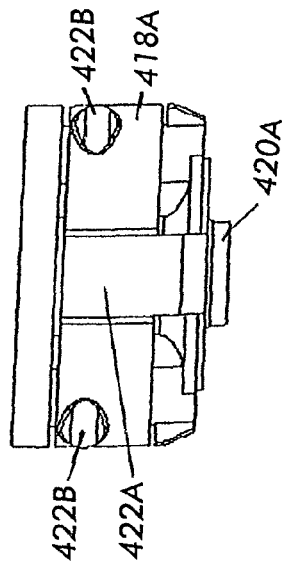
Figure 24:
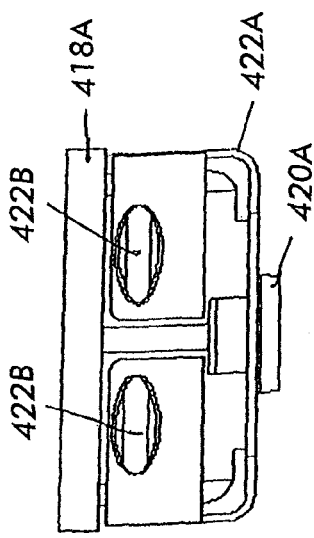
Figure 26:
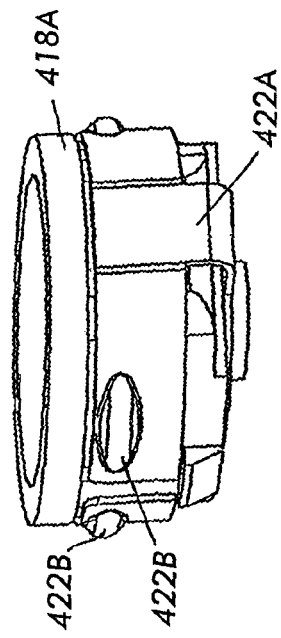
Figure 28:
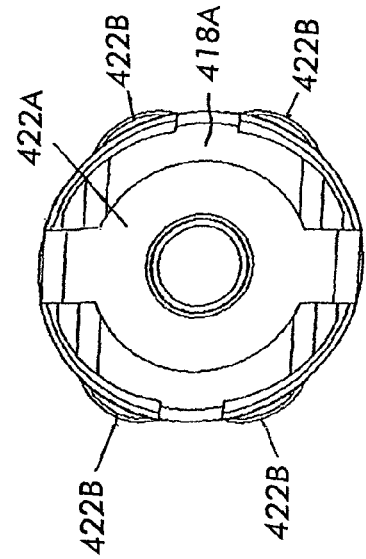
Figure 27:
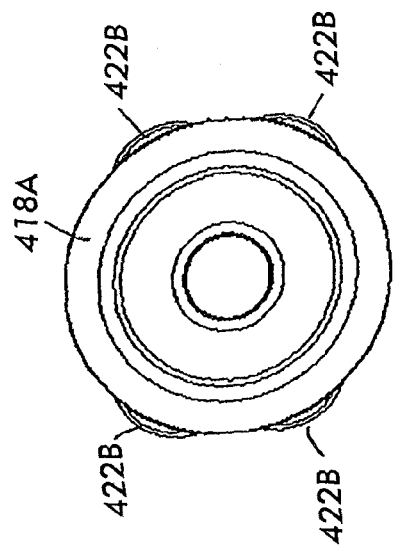
Figure 35:
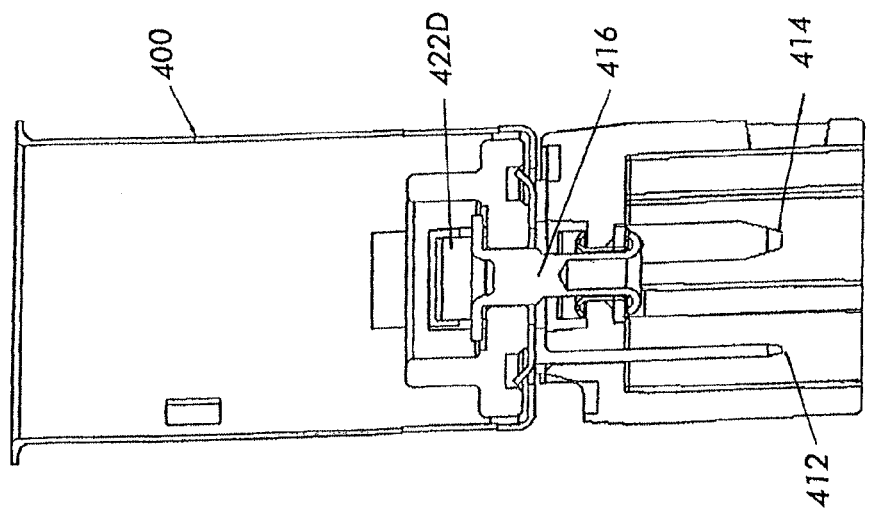
Figure 36:
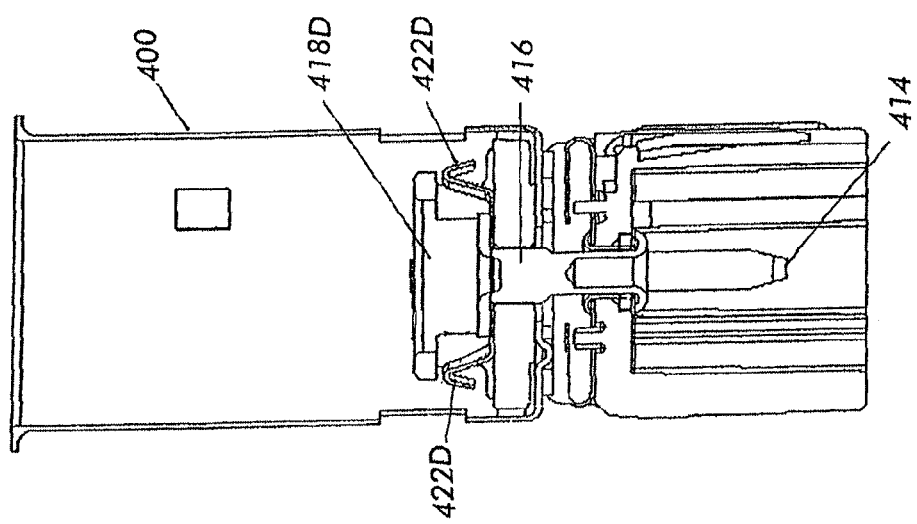
Figure 38:
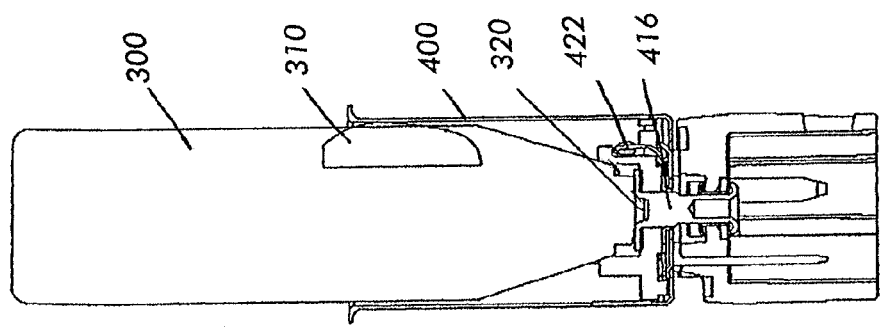
Figure 37:
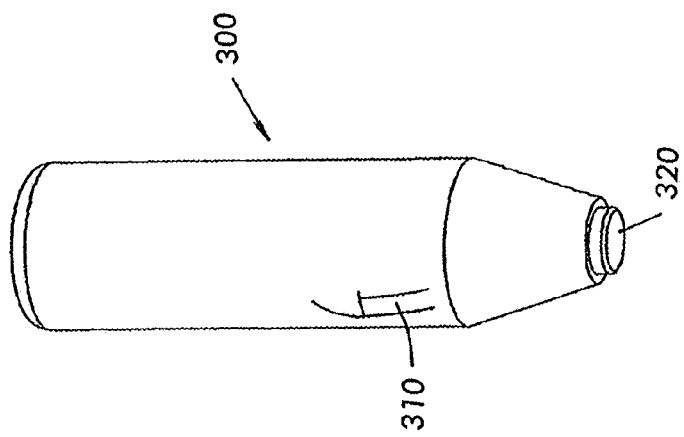

FIG. 14 shows a cut-away view of the universal socket according to the invention;

FIG. 15 shows the contact assembly of the universal socket in a bottom view;

FIG. 16 shows a top perspective view of the contact plate for the universal socket;

FIG. 17 shows a bottom view of the contact plate;

FIG. 18 shows the upper insulator of the contact assembly in a top perspective view;

FIG. 19 shows the upper insulator in a bottom view;

FIG. 20 shows the lower insulator of the contact assembly in a top view;

FIG. 21 shows the lower insulator from below;

FIG. 22 shows a bottom perspective exploded view of the contact assembly;

FIG. 23 shows the assembled contact assembly in a bottom perspective view;

FIGS. 24 and 25 show two different side views, turned 90°, of an alternative embodiment of the contact assembly;

FIG. 26 shows a perspective view of the alternative contact assembly;

FIGS. 27 and 28 show top and bottom views, respectively, of the alternative embodiment of the contact assembly;

FIGS. 29, 30 and 31 show yet a further contact assembly in side and top perspective views;

FIGS. 32, 33, 33A, 34, 34A and 34B show various views of yet still a further contact assembly;

FIG. 35 shows yet still a further embodiment of the socket in a cut away side view showing yet another contact assembly;

FIG. 36 shows the embodiment of FIG. 35 from the side;

FIG. 37 shows a prior art electrical plug for use with known vehicle electrical power outlets;

FIG. 38 shows how the prior art plug is received in the universal socket according to the present invention;

FIG. 39 shows an electrical accessory device plug according to the invention inserted in the universal socket according to the present invention; and FIGS. 40 and 41 show how the inventive electric cigar lighter of the second embodiment can be received in the universal socket according to the present invention, with FIG. 40 showing the cigar lighter in the stand-by position and FIG. 41 showing it in the powered-on position.

DETAILED DESCRIPTION OF EMBODIMENTS OF THE INVENTION

Figure 3:
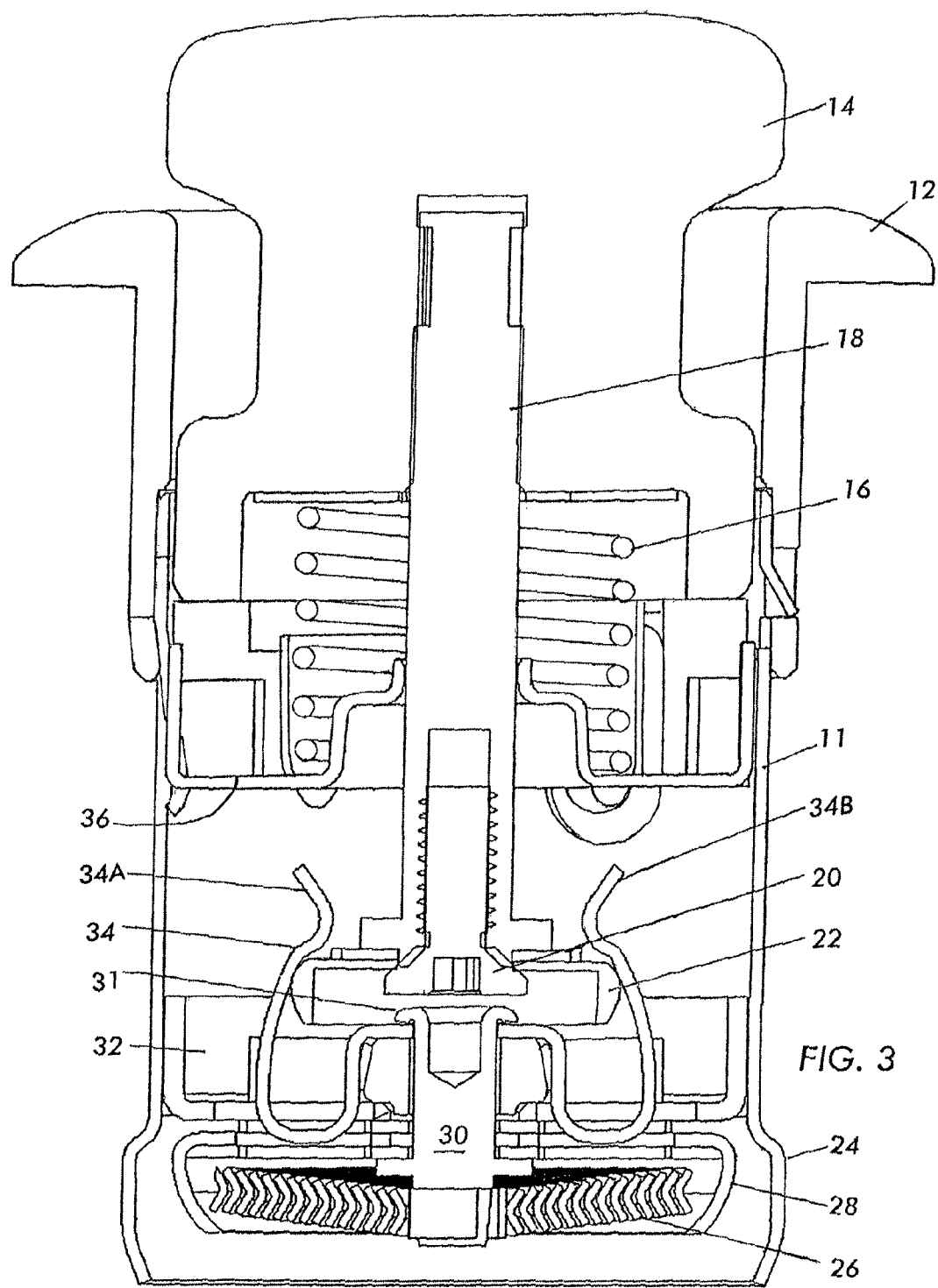
FIG. 3 shows a cut-away view the cigar lighter in the energized position (socket not shown)

With reference now to the drawings, FIG. 1 shows one embodiment of an electric cigar lighter 10 in accordance with the present invention received in a known vehicle electrical socket 200. The cigar lighter 10 is shown in FIG. 1 in its stand-by or deenergized position. FIG. 2 shows the cigar lighter in the stand-by position but not in its socket. FIG. 3 shows the cigar lighter in its energized position, but not in the socket.

The cigar lighter 10 comprises a cylindrical shell 11 that is made of metal, for example, steel plated to inhibit corrosion. The shell 11 is attached to a ring shaped knob escutcheon 12. A center knob part 14 is received in the escutcheon 12 for slidable movement therein against the opposition of a coil spring 16. The knob 14 is mounted concentrically on a metal shaft 18. The knob 14 and escutcheon 12 are typically made of a plastic material.

At the distal end of the shaft 18, a screw 20 is provided. The screw 20 retains an annular electrical contact 22 to the shaft 18.

At the base or distal-most end of the cigar lighter 10, there is provided formed into the cylindrical shell 11 an enlarged region 24. In the enlarged region 24, an electrical heating assembly including a heating element 26 is provided. The electrical heating element assembly has a contact/shield 28 surrounding the heating element 26. The heating element 26 is typically made of a resistance material such as nichrome wire or banding that is formed in a spiral shape having an outer portion of the winding secured to the shield 28 which functions as an electrical contact. The inner-most end of the heating element 26 is connected to a contact rivet 30 which is mounted in an electrical and thermal insulator 32, for example, made of ceramic. Connected electrically to the rivet 30 and thus to the heating element is a bimetallic element 34 mounted on insulator 32 that is formed in the shape of a clip having two opposed members 34A and 34B. The bimetallic element is provided as part of a switch in the lighter that allows energization of the heating element 26 until the heating element reaches an operating temperature, at which point the bimetallic element flexes outwardly and disengages from contact 22 as will now be explained, to deenergize the heating element 26.

FIG. 2 shows the cigar lighter in its deenergized position. FIG. 1 shows the cigar lighter engaged in the socket but in a deenergized state because the bimetallic clip element 34 is not in electrical contact with the contact 22.

Figure 1A:
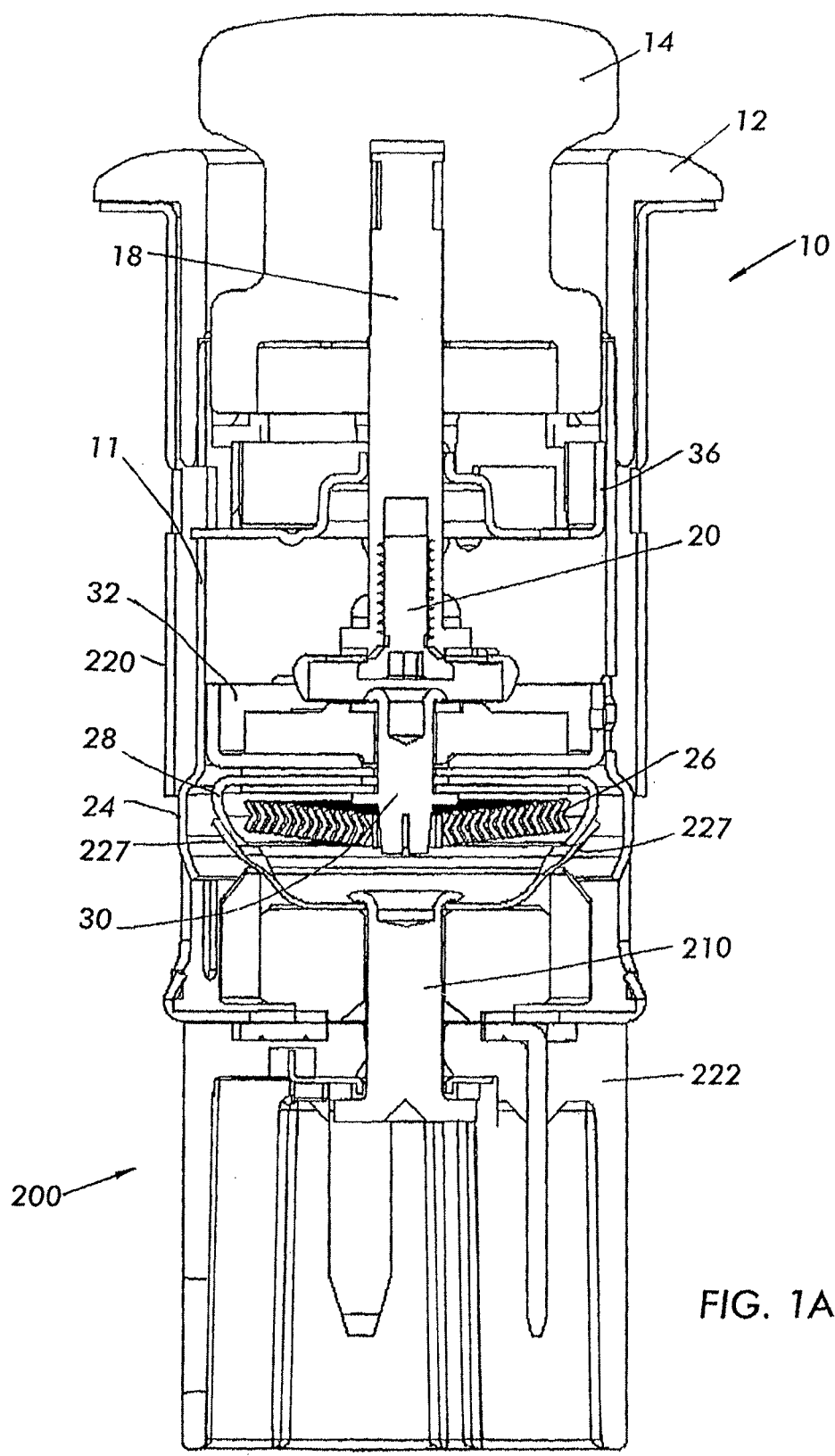
FIG. 1A shows the lighter of FIG. 1 in its socket in the energized position in a view rotated 90° FIG. 1.
Figure 1B:
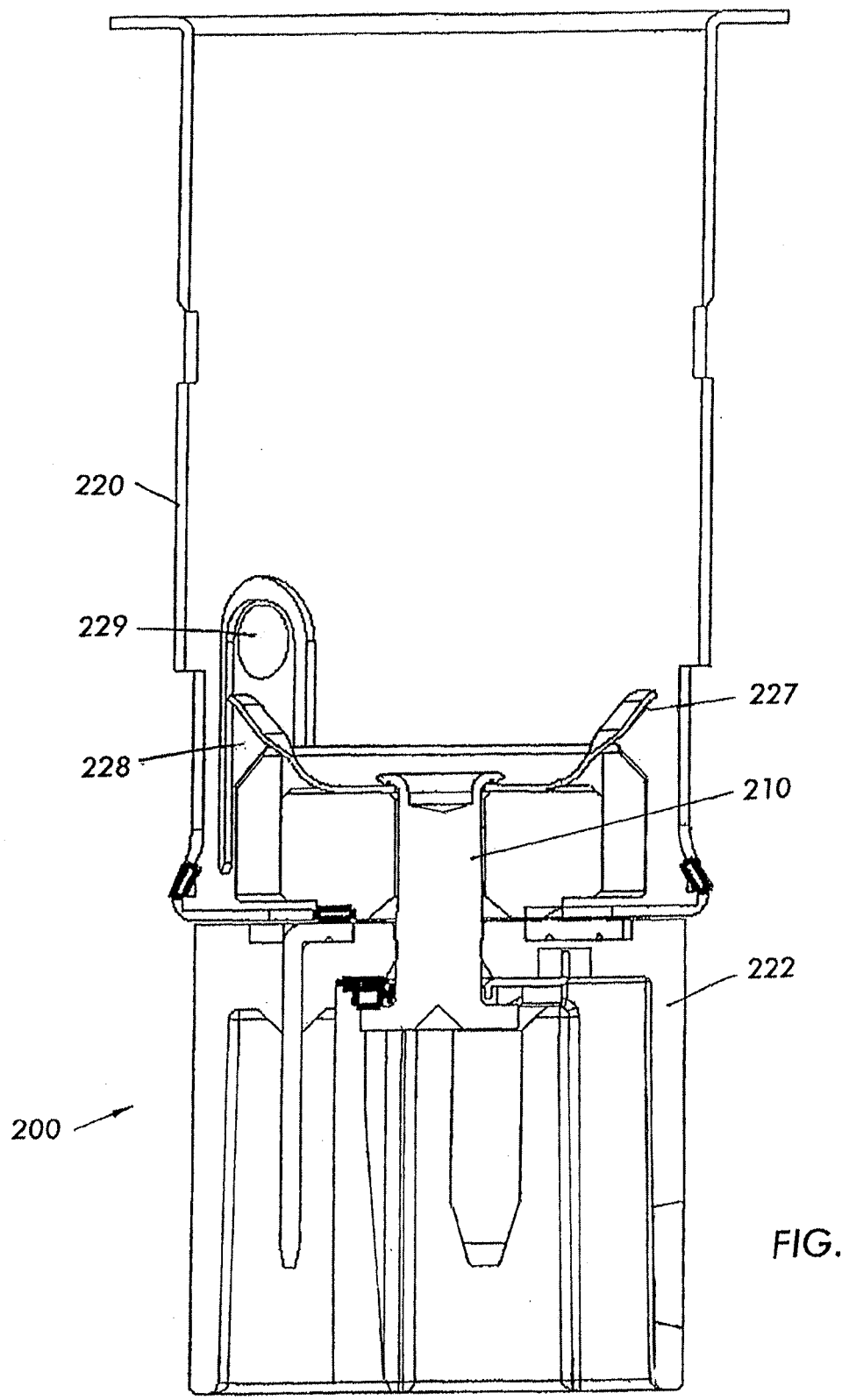
FIG. 1B shows details of the socket, including the B+ contact (power) spring in a view rotated 180° from FIG. 1A.

With reference to FIGS. 1, 1A and 1B, at the distal end of socket 200, an electrical insulator 222 is provided, made of molded plastic, typically, which includes two electrical terminals 224 and 226 for receiving electrical power from the vehicle electrical power source. One of these terminals 224 is coupled to the center rivet 210 of the socket 200 and the other is coupled to the socket shell 220.

When lighter 10 is inserted in socket 200, the enlarged area 24 of cylindrical shell 11 engages spherical feature 229 of retention lances 228 as shown in FIG. 1B. This engagement retains lighter 10 in proper position within socket 200. The invention places the retention lances 228 in a location that will not be distorted when accessory male plugs are inserted into socket 200, unlike traditional cigar lighters where the retention lances were placed closer to the opening of the metal socket shell 220. This provides protection to the retention lances from external forces.

To energize the heating unit, the knob 14 is placed into the position shown in FIG. 3, that is, it is pressed into the annular escutcheon element 12 against the bias of the compression spring 16. The annular contact 22 is received between the two opposed ends 34A and 34B of the bimetallic element 34 as shown in FIG. 3. Thus there is electrical contact between contact 22 and bimetallic element 34. This completes an electrical circuit from the socket. In particular, when the lighter unit 10 is inserted in the socket 200 and the knob 14 is in the pushed-in position as shown in FIG. 3, it places the lighter unit in the electrically energized condition. Electrical current flows from the vehicle positive supply (positive current convention is used herein) connected to terminal 224 (FIG. 1) coupled to socket rivet 210 which is electrically coupled to socket terminal 227 as shown in FIGS. 1A and 1B. The shield 28 is electrically and mechanically engaged with terminal 227 when knob 14 is in the pushed-in position. Current flows through the coiled heating element 26 to heat up the heating element 26 and then to the center rivet 30 to the bimetallic element 34 which is engaged electrically and mechanically with the contact 22. The electrical circuit is completed through shaft 18 and a conductive element 36 to the external lighter shell 11, which is coupled electrically to the metal socket shell 220 and hence to the vehicle ground return via terminal 226.

When the heating element 26 reaches operating temperature, heat that is convected/radiated/conducted to the bimetallic element 34 causes the bimetallic element ends 34A and 34B to flex outwardly, thereby allowing the contact 22 to move out of engagement therewith and move upwardly away from the bimetallic element 34 by virtue of the force provided by the compression spring 16. This breaks the electric circuit and the heating element 26 is no longer energized but can be removed from socket 200 to be utilized to light a cigarette or cigar.

The invention places the bimetallic switch contact 34 within the cigar lighter, unlike traditional cigar lighters where the bimetallic element was placed in the socket 200. This provides protection to the bimetallic contact from external forces.

The proximity of the bimetallic contact 34 to the heating element 26 provides for improved heat transfer resulting in improved control of the heating element temperature by conductive and convective means. The placement of the switch contact 22 in connection with the shaft 18 connected to the actuating knob 14 provides for lower surface temperature of the knob 14.

The contact 22 also contains a feature, called a "relite" feature, to allow for continuous electrical power to the lighter unit when the bimetallic contact 34 is flexed outwardly from heat transfer. Specifically, if a user desires to keep the heating element energized even after the bimetallic element has deflected outwardly to cause the heating element to be deenergized, the user can push the knob 14 back into the knob escutcheon 12 and hold the knob 14 depressed to maintain the heating element 26 in the energized position. The heating element 26 will then continue to be energized, not through electrical contact between the contact 22 and the bimetallic element 34, but by electrical contact between the head 37 of the screw 20 and the top 31 of the center rivet 30 as shown in FIG. 3A. This will ensure electrical continuity between the ground side of the heating element 26 and the head 37 of the screw 20 and therefore to the shell 11 and thus to the socket shell 220.

As will be explained in more detail below, should the temperature inside the lighter unit increase beyond a safe temperature, particularly if this feature to keep the heating element 26 energized is over-used, there is a feature provided in the lighter unit 10 to provide an electrical short circuit to blow a fuse in the electrical circuit providing power to the cigar lighter socket 200 thereby to prevent the risk of fire hazard or melting of the cigar lighter components in the socket or the wiring to the socket.

FIG. 4 shows a second embodiment of the cigar lighter in a perspective view. The second embodiment comprises a two-part knob comprising a push in part 14A and collar 14B and a cylindrical shell 11A which is received in a new socket (shown in FIG. 14) to be described herein.

Figure 5A:
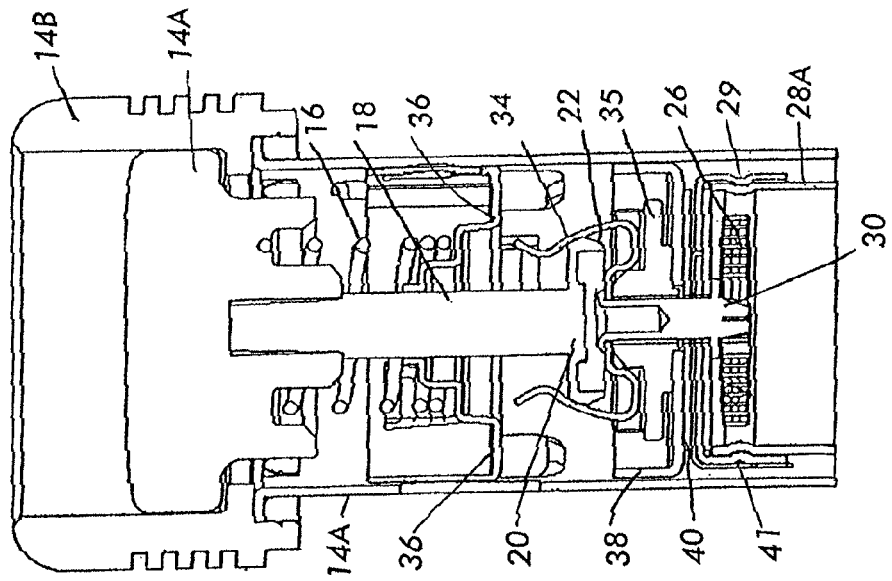
FIG. 5A shows the second embodiment of the cigar lighter in its energized or powered-on position (socket not shown)
Figure 5:
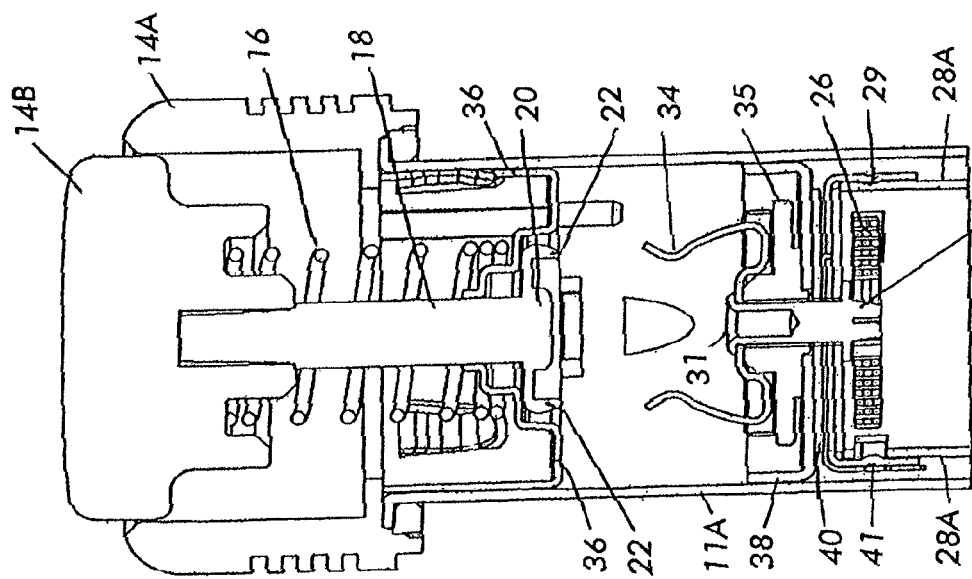
FIG. 5 shows the second embodiment of the cigar lighter in a cut-away view (socket not shown)

Turning to FIG. 5, the cigar lighter of FIG. 4 is shown in a cut-away view in a deenergized position. The knob 14 comprises a telescoping knob part 14B received in outer part 14A and which is actuated by a user and is held in the position shown in FIG. 5 against the bias of a coil spring 16.

The cigar lighter of FIG. 5 includes a bimetallic element 34, shaft 18 and contact 22. Shaft 18 and contact 22 are in electrical contact with portion 36 which is in sliding electrical contact with the outer shell 11A.

At the distal end of the cigar lighter, there is provided an electrically conductive cylindrical metal contact/coil retainer 28A. The contact 28A is received in a cap 29. The heating element 26 is in the shape of a spiral as in the embodiment of FIG. 1 and has its outer periphery in electrical contact, as will be explained below, with the contact 28A. The cap 29 is also made of a conductive material such as metal.

Figure 6:
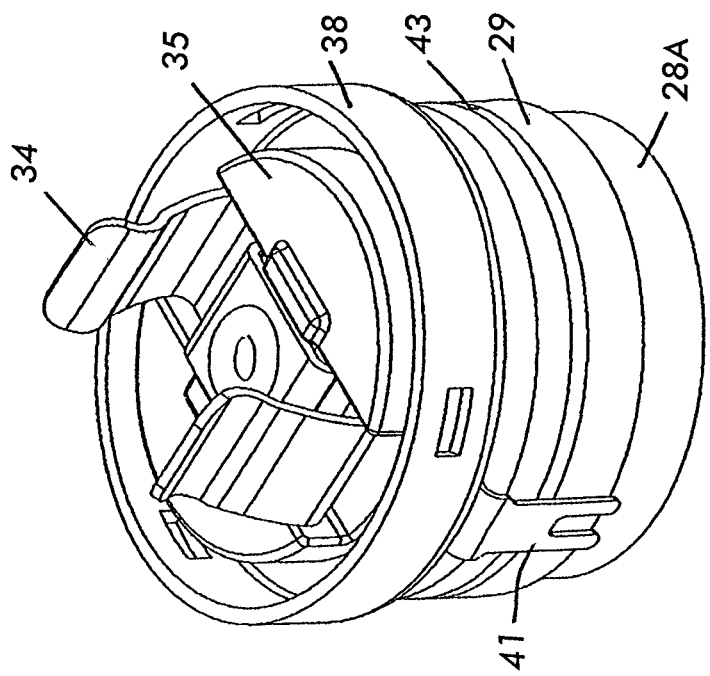
FIG. 6 shows the heating element assembly of the second embodiment in a perspective view.

FIG. 6 shows the heating element assembly in a perspective view showing the bimetallic contact 34 which is received on an insulator 35. The insulator 35 is located concentrically in a ground retainer 38 which is in contact with the outer shell 11A. The ground retainer 38 is insulated from the bimetallic contact 34 and the central rivet 30 and also from cap 29 by an insulator 40 (FIG. 5).

Figure 7:
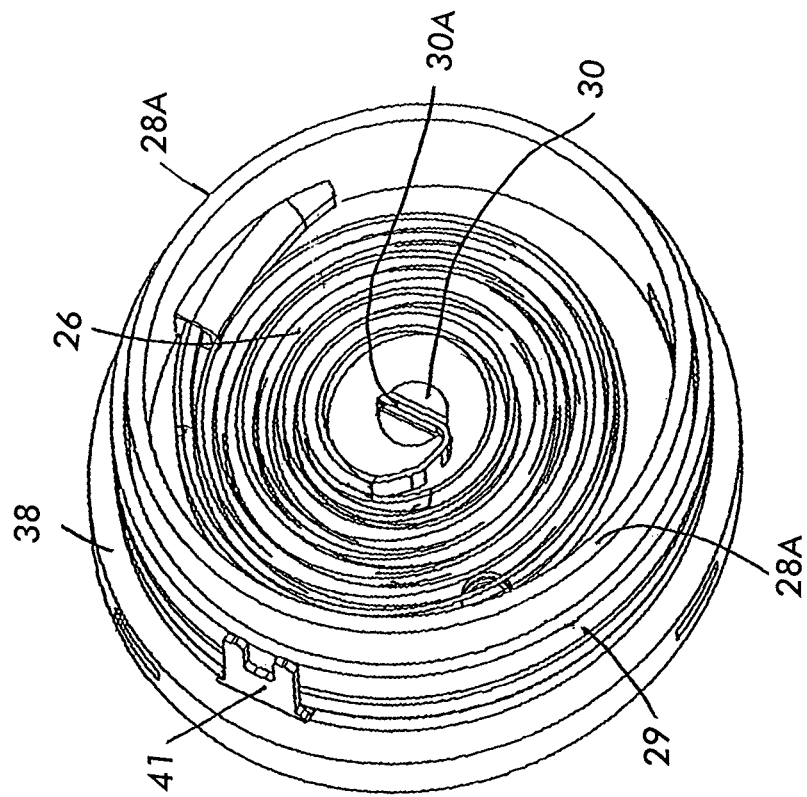
FIG. 7 shows a bottom perspective view of the heating element assembly.

FIG. 7 shows a bottom perspective view of the heating element assembly showing the ground retainer 38, the cylindrical contact 28A and the cap 29. There is an insulator 40 disposed between the ground retainer 38 and the cap 29. Disposed above the cap 29 is furthermore a thermal bimetallic protector 41, which is designed to protect the electric cigar lighter from overheating, as will be explained below.

As shown in FIGS. 7 and 8, the heating element 26 is spirally wound and has an outside end 26A that is received between the contact 28A and the cap 29. The external end or tail 26A of the heating element 26 is captured in a circumferential groove 42 that is provided in the contact 28A, as shown in FIG. 8. The tail 26A is captured between the contact 28A and the cap 29, securely held in position and making electrical contact with the contact 28A. The tail 26A is received in the circumferential groove 42 through a slot 44 provided in the contact 28A, as shown in FIG. 8. Cap 29 is also preferably provided with an aligned groove 43 in FIG. 6 to securely capture the tail 26A and ensure good electrical contact.

The inner end of the heating element 26 is securely fitted in a slot 30A provided in the end of the center rivet 30 in the center of the heating element assembly, as shown in FIG. 7, for example, by swaging.

FIG. 5A shows the cigar lighter in the energized condition. Electrical current flows from cylindrical contact 28A through heating element 26, to rivet 30 to clip 34 thence to annular contact 22 to shaft 18 and then through member 36 to shell wall 11A and thence to the socket wall to the ground return. When bimetallic contact 34 has reached a predetermined temperature corresponding to an adequate temperature to allow ignition of a cigar, the ends of clip 34 flex outwardly enough to interrupt the circuit and spring 16 retracts annular contact 22.

As described above, there is also a bimetal thermal protector 41 as shown in FIGS. 5, 6 and 7, that flexes outwardly in the event the temperature in the heating element assembly exceeds a predefined safe temperature due to overheating of the heating element 26. If this occurs, the bimetal thermal protector 41 flexes radially outwardly, making contact with the external shell 11A, causing a short circuit to ground and blowing a fuse in the supply line to the socket, thereby deenergizing heating element 26 and preventing the risk of fire hazard. Protector 41 is in electrical contact with the cap 29 and contact 28A.

FIG. 9 shows the cigar lighter according to the present invention utilizing an alternative embodiment of the coil retainer. In this embodiment, a full rollover coil retainer is used.

This coil retainer design is similar to disclosures contained in U.S. Pat. Nos. 4,007,353 and 4,045,865.

In particular, the embodiment of the cigar lighter in FIG. 9 is show inserted in its socket. In particular, the differences in this embodiment relate to how the heating element 26 is retained in the coil retainer.

In the embodiment shown in FIG. 9, a full rollover coil retainer 27 is employed. Details are shown in FIG. 9A. In the embodiment shown in FIG. 9, the coil retainer cap 28AA also functions as the positive side contact for the cigar lighter, similarly to the contact 28A of FIG. 5. The coil retainer cap 28AA is stepped down as shown at 28AAA. In the embodiment shown in FIG. 9A, the coil retainer cap 28A is not stepped down, however, a circumferential bead 28AAAA provides retention of the full rollover coil retainer 27 to the coil retainer cap 28A, 28AA.

Another embodiment replaces the circumferential bead 28AAAA with localized multiple dimples 28ABA (See FIG. 9AA).

In this embodiment of the heating element assembly, the heating element 26 is held in position by a rolled over coil retainer 27. This is shown in more detail in FIG. 9A. In particular, the heating element tail 26A, as shown in FIGS. 9A and 9B is received in the coil retainer 27 during the manufacturing process. The heating element 26 is inserted into the coil retainer 27 and during the manufacturing process, the edge is rolled over as shown in FIG. 9C to retain the tail 26A of the heating element and thereby provide a secure electrical and mechanical connection. FIG. 9D shows how the heating element tail 26A is captured when the coil retainer 27 is rolled over around it. The embodiment of FIG. 9 has what is called a full rollover coil retainer because the coil retainer is rolled over along the entire circumference of the coil retainer.

Figure 9F:
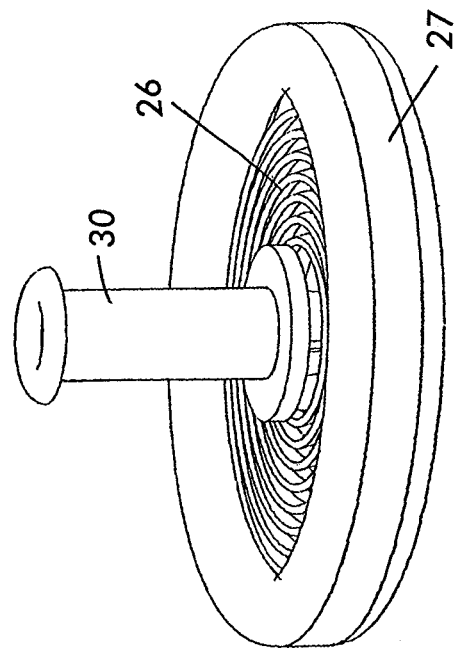
Figure 9E:
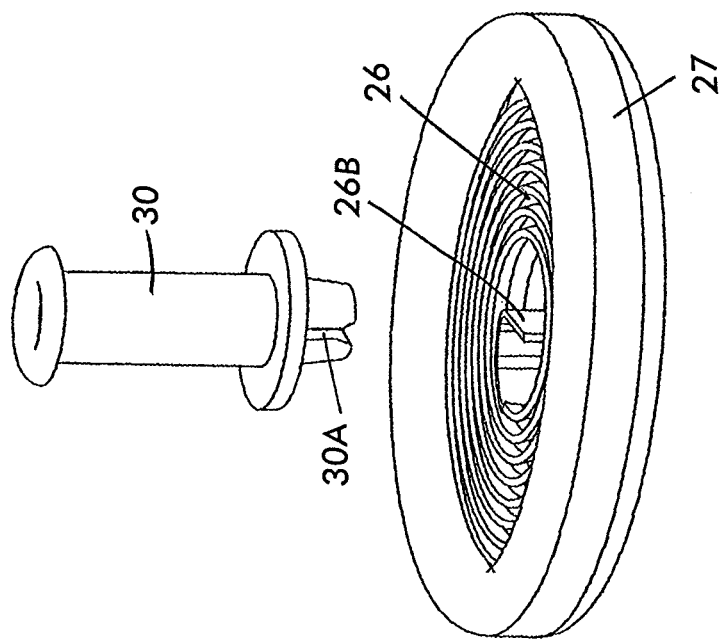
Figure 9H:
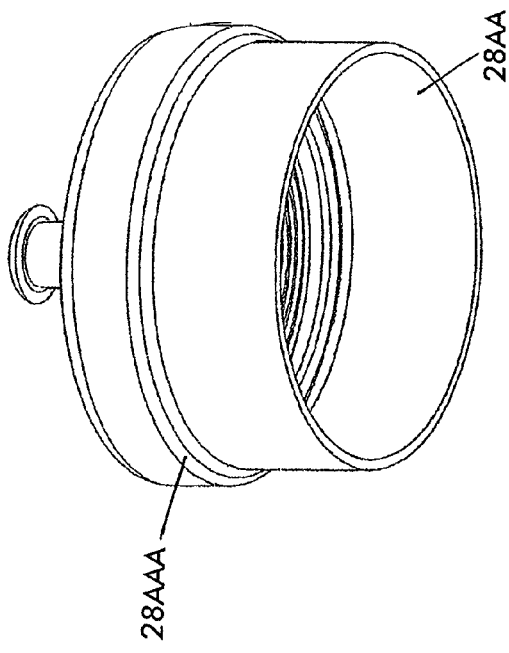
Figure 9I:
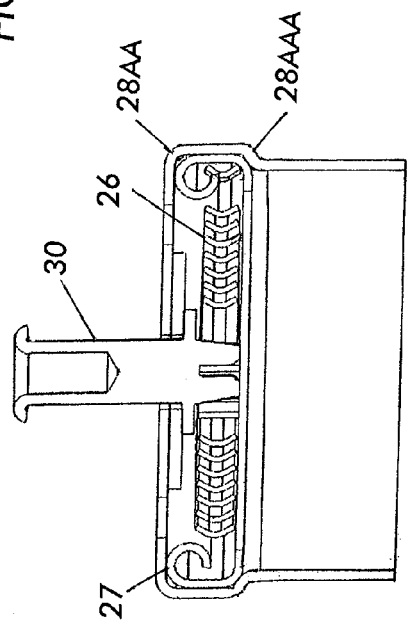
Figure 9G:
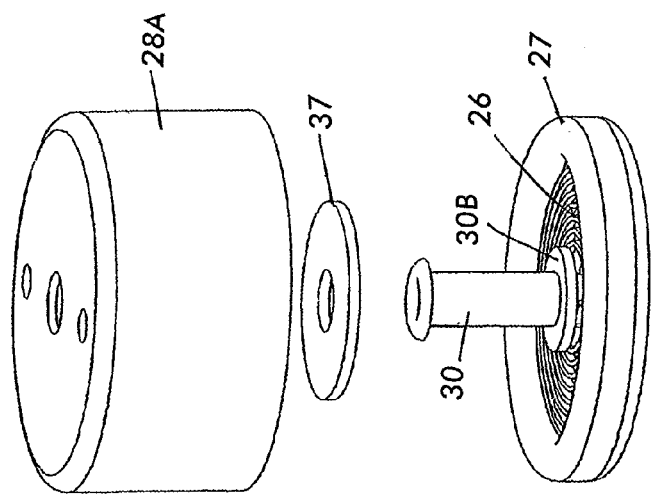

FIG. 9E through 9I show further details of the manufacturing process. After the rollover of the edge of the coil retainer 27, the rivet 30 is inserted as shown in FIGS. 9E and 9F. The center terminal 26B of the heating element is swedged to the slot 30A of the rivet 30 to securely fasten it mechanically and electrically to the rivet 30. FIG. 9F shows the rivet assembled to the heating element 26 and coil retainer 27. Then, as shown in FIG. 9G, the coil retainer cap 28A, which functions as the positive side electrical contact to the socket, is assembled to the rivet with an insulator 37 provided between the coil retainer cap 28A and the shoulder 30B of the rivet 30. Electrical insulation must be provided between the coil retainer cap 28A which functions as the positive side contact and which is electrically engaged to the coil retainer 27.

FIG. 9H shows the alternative embodiment with the step down diameter coil retainer cap 28AA showing the step down at 28AAA. FIG. 9I shows the step down embodiment in a cross section.

Figure 9K:
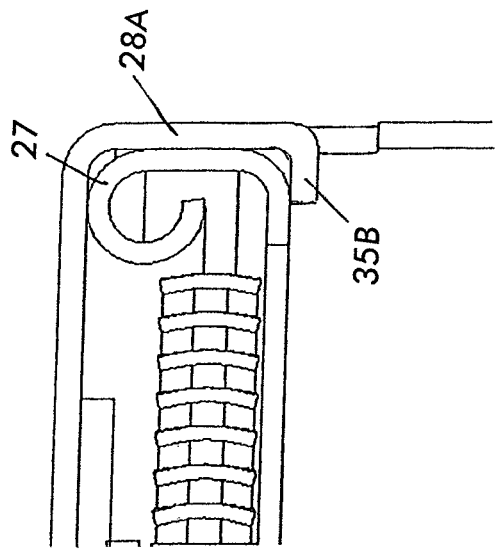
Figure 9J:
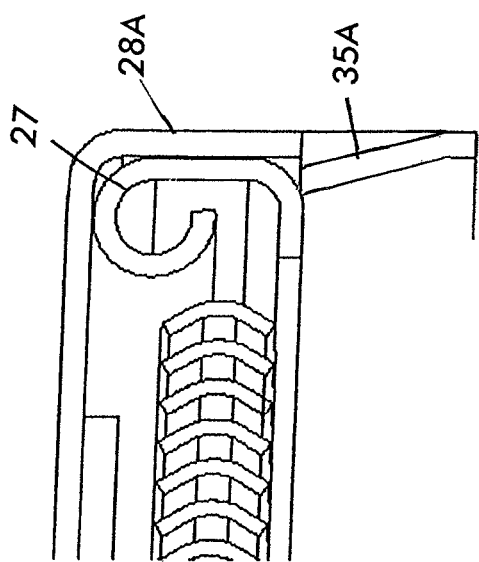

FIGS. 9J and 9K show alternative ways of insuring that the coil retainer 27 is securely held in the coil retainer cap contact 28A. In one embodiment, three localized snap tabs 35A are provided, as shown in FIG. 9J, angularly spaced about the coil retainer cap 28A. For example, they may be equiangularly spaced. Although three tabs are shown, a lesser or greater number can be used.

FIG. 9K shows another embodiment showing bent tabs 35B. A plurality of these can be used angularly spaced about the coil retainer cap 28A. A lesser or greater number can be used.

Figure 10D:
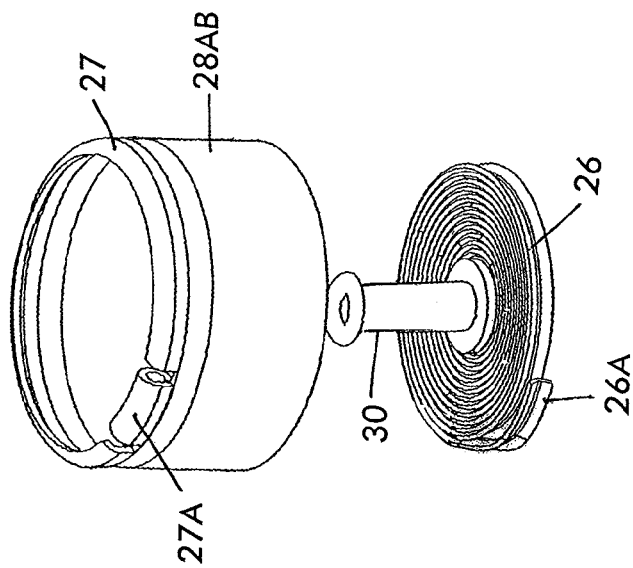
Figure 10C:
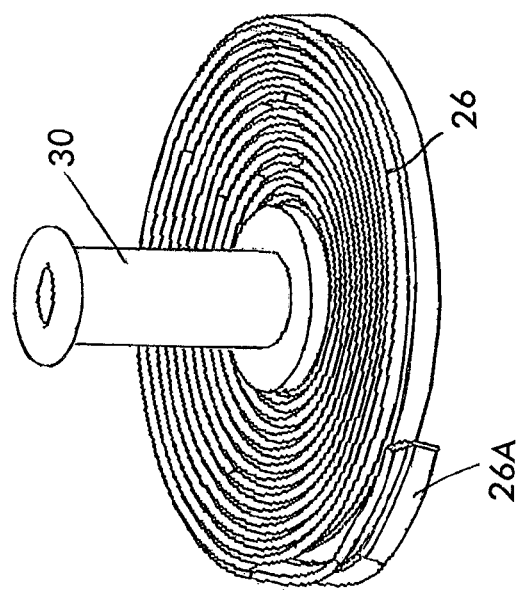
Figure 10B:
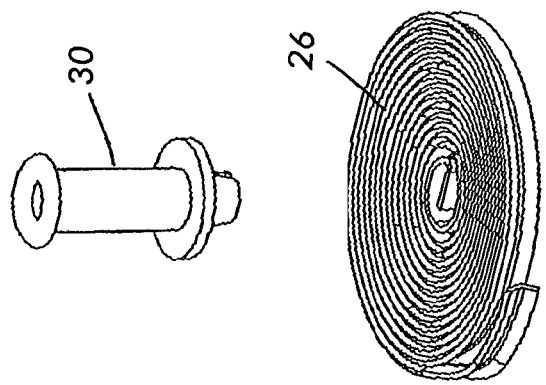
Figure 10G:
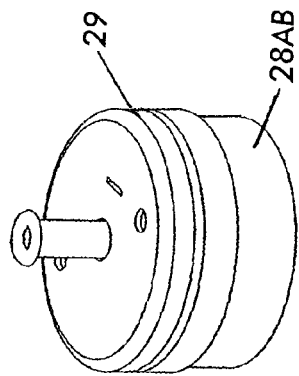
Figure 10H:
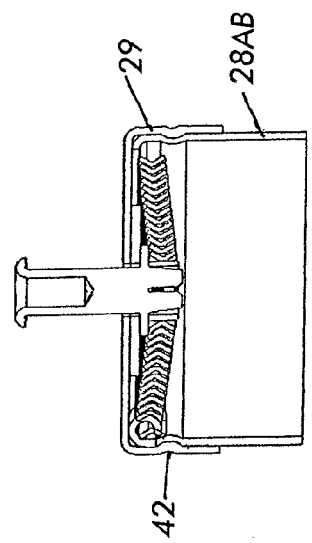
Figure 10F:
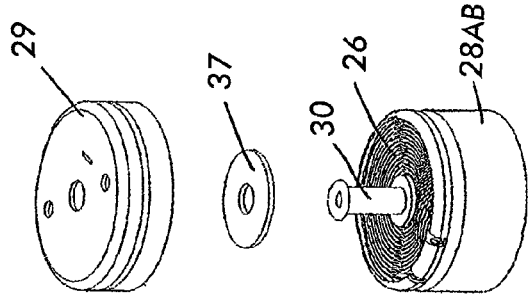
Figure 10E:
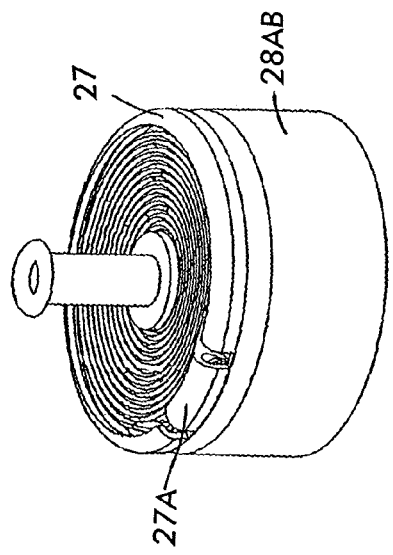

FIG. 10 shows another embodiment of the heating element assembly in the cigar lighter according to the present invention (shown in the socket). In this embodiment, a partial rollover coil retainer 27A is utilized. In this embodiment, shown in greater detail in FIGS. 10A and 10AA, the coil retainer 27A utilizes a rollover only in a certain angular region of the perimeter of the coil retainer 27A to secure the tail 26A of the heating element 26. In this embodiment, shown more particularly in FIG. 10AA, and even more particularly in FIGS. 10B-10D, the heating element 26, as shown in FIG. 10B is attached to the rivet 30. As shown in FIG. 10D, the tail 26A of the heating element is then inserted into a coil retainer 28AB which functions as an integral coil retainer and cigar lighter positive side contact. The heating element 26 is aligned with a partial rollover region 27A or inserted into the partial rollover region 27A which is then crimped to provide the secure electrical contact to the tail 26A of the heating element 26. Thus, in this embodiment, it is not necessary to roll over or crimp the entire coil retainer 27. As noted, in this embodiment, the coil retainer 27 and the contact 28AB form a single integral component. Then, as shown in FIG. 10F, the heating element assembly comprising the heating element 26 held in the coil retainer 28AB and fastened to the rivet 30 is attached to the coil retainer cap 29 with rivet 30 with an insulator 37 therebetween, as in the embodiment of FIG. 9. Then, to insure engagement between the cap 29 and the coil retainer 28AB, a bead 42 is rolled in the cap 29 to securely engage the cap 29 to the coil retainer 28AB. See FIGS. 10G and 10H.

FIG. 11 shows a further embodiment of the thermal protection bimetal contact, here identified by 41A.

In FIG. 11, the bimetal 41A is pointed upwardly towards the knob 14. Should the operating temperature increase to an unsafe temperature, the bimetal 41A flexes radially outwardly and makes electrical contact with the ground retainer 38 causing a short circuit to remove power to the cigar lighter and thus prevent a fire hazard.

In an alternative embodiment, shown in FIG. 12, the thermal protection bimetal is shown at 41B. In this embodiment, the bimetal 41B is U shaped in cross section as shown in FIG. 12 and is designed to flex outward and make contact with the ground retainer 38 thereby to provide a short circuit to blow the fuse and remove the electrical supply to the cigar lighter.

Note that in FIGS. 11 and 12, the contact 28A is used. However, the contact/shield 28 of FIGS. 1 to 3 could also be employed.

A more detailed view of the thermal protection bimetal used in FIG. 5 is shown in FIG. 13. In this embodiment, the bimetal 41 points distally and flexes outwardly to electrically engage the outer shell 11A to cause a short circuit in the event of an overcurrent, blowing the fuse supplying electrical power to the cigar lighter to prevent a fire hazard.

FIG. 13A shows an alternative and presently preferred embodiment of the thermal protection bimetal element. As in the other embodiments, this element relates to a means that provides thermal protection from excessive heat transfer from the heating element and is located within the heating unit as compared to placement within the socket.

With reference to FIG. 13A, a circular bimetallic disc 41C consisting of cutouts 41CC that create one or more activation beams 41D is placed in intimate contact with the coil retainer cap 29. Locking holes 41E are positioned asymmetrically in alignment with locking pins 35A of ceramic insulator 35 to insure the proper orientation of the low expansion side of the bimetallic disc 41C. Improper orientation will result in lack of concentricity of the disc to the circumference of coil retainer cap 29 and thus problems with assembly into subsequent assembly levels. This lack of concentricity will be obvious during assembly and thus will prevent such improper assembly.

An insulating isolation disc 40A, with corresponding cutouts 40B that allow the bimetallic cantilever beam(s) 41D to deflect and having locking holes 40E is aligned to the thermal protection bimetallic disc 41C allowing the activation beam 41D to deflect and short to the ground retainer 38 upon exposure to excessive heat.

The isolation disc 40A provides electrical isolation and the means to control the gap between the bimetallic disc 41C and the ground retainer 38, a distance that effectively determines the temperature of the heating element at which the bimetallic disc will short to ground and the current will increase until the in-line fuse will open.

The embodiment of FIGS. 13A-F introduces a simple and precise way to control the gap through which the bimetallic beam 41D will travel to short to ground the electrical circuit. The prior art provides for two or more dimensional features, with associated tolerances to control this gap. This method requires only one feature to accomplish the establishment of the gap.

Unlike the prior art, this embodiment maintains a uniform temperature of the bimetallic disc 41C that changes in temperature correspondingly while the coil retainer cap 29 increases in temperature. The prior art results in sections of the bimetallic member cooling by convection heat transfer resulting in a thermal gradient across the bimetallic member prior to the deflection of the member due to the presence of elevated temperature. This can cause an unreliable actuation.

The positioning of the asymmetrical locking holes in the coil retainer cap 29 (29E), in the thermal protection disc 41C (41E), in the isolation disc 40A (40E) and in the ground retainer 38 (38E) that align with asymmetrical locking pins 35A in the insulator 35 provides visual verification for the orientation of the bimetal disc 41C low expansion side. Should the bimetal disc's low expansion side be improperly oriented, then the circumference of the disc would project beyond the envelope of the coil retainer cap's circumference which in turn will prevent the subsequent assembly in the ash guard. Thus, it will be obvious if the disc 41C is improperly oriented, i.e., the high thermal expansion side pointing up instead of down.

In contrast to the cigar lighter embodiment of FIG. 1, the embodiment of FIG. 5 employs a new form of the positive supply side cigar lighter electrical contact, that is, the cylindrical contact 28A. In the embodiment of FIG. 1, the positive side contact is of the conventional type, i.e., the contact/shield member 28 which contacts the socket positive contact. In contrast to this conventional design, in the embodiment shown in FIG. 5, the new design contact 28A is of a cylindrical design, that makes contact with a new and improved socket contact which will be described later herein. The new contact 28A provides an improvement in current handling capability by providing a stable and low contact resistance electrical connection between the contact 28A and the heating element 26 and also by providing a shelf cleaning (sliding contact) capability to minimize electrical arcing with the socket contact.

The electric cigar lighter disclosed herein provides for a means to switch the cigar lighter on that is protected from external forces because the bimetal element 34 is placed within the lighter unit in comparison to prior art designs where it is placed in the socket.

The electric cigar lighter according to the invention provides for improved thermal control of the heating element by placing the bimetallic element 34 in close proximity to the heating element and allowing heat transfer from the heating element to the bimetallic element by conduction, conduction and radiation.

The electric cigar lighter according to the present invention provides for a continuous power feature that allows for continuous electrical current flow after the bimetallic contact 34 separates from the contact 22, interrupting the current flow, to allow for continuous heat supply but yet ensuring proper thermal protection of the cigar lighter. This feature is activated when the actuating knob 14 is depressed continuously, allowing the head of screw 20 to contact head 31 of rivet 30.

The cigar lighter cylindrical electrical contact 28A allows electrical contact from the socket to be made on the inner diameter of the contact element 28A. This provides an ability for a shelf cleaning sliding action that reduces potential detrimental effects of electrical arcing found in prior art designs. In order to accomplish this, a new design socket contact, to be described below, is used.

The electrical cigar lighter provides for a stable electrical contact including low contact resistance between the heating element 26 and the coil retainer/contact 28A. Furthermore, the new design contact 28A functions as a passive, non moving ash guard that eliminates all associated functional problems with moving parts in prior art ash guard designs.

Furthermore, the cigar lighter of the present invention provides for thermal protection of the cigar lighter heating unit and socket by placing the thermal protection bimetal device within the lighter unit itself. The cigar lighter according to the invention achieves a commercial advantage by disposing the thermal protection device within the lighter unit as opposed to the conventional placement in the socket. Thermal protection is required in order to remove electrical power to the heating element upon reaching a prescribed temperature to prevent a safety hazard. Placing the thermal protection element within the heating unit allows the original equipment manufacturer to provide a universal power socket that does not have the added cost associated with thermal protection.

FIG. 14 shows a universal power socket which can be employed to provide power to the cigar lighter shown in FIG. 5 as well as to other electrical accessory devices, for example, electrical chargers, laptop computers, etc.

In the past, vehicle electrical power sockets have been of several designs. In one design, a bimetallic element is provided in the socket for use with a cigar lighter intended to be inserted into the socket. In another design, the socket does not include a bimetallic element. Instead, a centrally located positive side vehicle electrical supply connection is provided that is adapted to contact a spring loaded contact on an electrical plug. In another design adapted to be used with cigar lighters where the bimetallic element is built into the cigar lighter, a positive side supply socket contact engages with the lighter positive side supply contact. See U.S. Pat. No. 6,740,850 or EP 09004224.3. In all of these designs, the ground connection is provided by the shell of the socket.

The problem with these designs is that inadequate contact may be made with the central or positive contact. Often, the prior art plugs that are employed with these sockets have a spring loaded center contact that engages with the center contact of the socket through the action of the spring force to maintain electrical connection. Similarly, the lighter of the above two patent documents relies on spring contacts for the positive side electrical contact. However, these can provide an inadequate electrical contact.

An example of the prior art electrical accessory plug 300 is shown in FIG. 37. This design employs a spring loaded curved ground contact 310 for making electrical contact with the shell of the socket. A center spring loaded positive contact 320 is provided for making contact with the positive side socket contact. Often the positive contact arcs when the electrical contact is first made or when it is removed, resulting in damage to the contact which causes higher resistance electrical connections to be formed. The socket of the present invention eliminates these effects.

At the same time, the socket according to the present invention is a universal socket because it can also be employed with the prior art accessory plug 300 shown in FIG. 37.

Turning to FIG. 14, the power socket according to the present invention is shown. In this embodiment, the socket comprises a socket well 400 and an electrical connector portion 405 comprising an insulating body 410 provided with electrical terminals 412 (FIG. 36) and 414 for connection to the vehicle electrical supply. Terminal 414 is electrically connected to a central rivet 416. The rivet 416 holds an upper insulator 418 concentrically in the socket shell 400. The rivet is thus insulated from shell 400. In electrical connection with the rivet 416 and clamped between the insulator 418 and an additional lower insulator 420, is an electrical contact plate 422. The electrical contact plate 422 includes a plurality of radially and proximally directed contact elements 422A as shown in FIGS. 16 and 17. The lower insulator 420 insulates contact plate 422 from the shell 400.

Turning to FIG. 16, the electrical contact plate 422 is shown. It has a plurality, in the embodiment shown, three, sliding spring loaded electrical contacts 422A which have contact buttons directed radially outwardly. These contact buttons 422A are designed to make electrical contact with the inside surface of coil retainer/contact element 28A of the cigar lighter of FIG. 5 and also to an accessory plug to be described hereinafter which can be employed to provide electrical power to electrical/electronic accessory devices that are used in a motor vehicle. FIG. 16 shows the electrical contact plate in a top perspective view. FIG. 17 shows the electrical contact plate 422 in a bottom perspective view. The electrical contact plate 422 is held in position by the rivet 416 which extends through a central opening 423 of the contact element. The central opening 423 has gripping surfaces 421 for ensuring good electrical contact to rivet 416.

FIGS. 18 and 19 show top and bottom perspective views of the upper insulator 418.

The upper insulator 418 may include a plurality of alignment recesses 424. The upper insulator 418 and lower insulator 420 provide electrical isolation of the contact plate 422 and rivet 416 from the socket well 400.

The lower insulator 420 is shown in FIGS. 20 and 21 in top and bottom views respectively. The lower insulator may include a plurality of alignment projections 425 which are received in the alignment recesses 424 of the upper insulator 418. The lower insulator 420 provides for electrical isolation of the rivet 416 and contact plate 422 from the well 400. The alignment projections 425 provide for indexing to the contact plate 422 and the upper insulator 418. The lower insulator 420 includes a pilot shoulder 426 that has an inner and outer diameter. The pilot shoulder outer diameter and the inner diameter provide for concentricity control of the contact plate 422 to the well 400.

FIG. 22 shows an exploded bottom view of the contact assembly including the rivet 416, upper insulator 418, contact plate 422 and lower insulator 420. FIG. 23 shows a perspective bottom view of the assembled contact assembly. Rivet 416 holds the contact assembly to the socket insulator 410 with the well 400 bottom clamped between lower insulator 420 and socket insulator 410. See FIG. 14.

FIGS. 24-28 show an alternative contact assembly configuration. In this configuration, the electrical contact plate 422A has a plurality of spring loaded contact projections 422B that protrude through openings in the insulator 418A to make contact with the internal diameter of the contact element 28A shown in FIG. 5. The lower insulator is indicated at 420A.

Another embodiment is shown in FIGS. 29-31. In this embodiment, the contact plate 422B has two opposed contacts 422BA that make contact with the inner diameter of the contact 28A of FIG. 5. A single insulator 418B is used in this design.

FIGS. 32-34 including FIGS. 33A, 34A and 34B show a further embodiment employing a contact plate 422C having two contact elements. In this embodiment the insulator is identified by reference numeral 418C.

Common to all these embodiments is that the electrical contact plates 422, 422A, 422B and 422C have contact buttons that are spring loaded to make contact with the inner surface of the contact 28A, shown in FIG. 5, by a wiping or sliding action, thereby providing a shelf cleaning of the contact, leading to less arcing and fewer deposits on the contact interfering with adequate electrical conductivity.

FIGS. 35 and 36 show yet an alternative embodiment. In this embodiment, the contact plate 422D has fingers that extend upwardly and then bend downwardly so that the downwardly bending portions can flex when they rub against the inside surface of contact 28A when the accessory plug or cigar lighter is inserted.

Thus, the universal power socket can be employed to power the cigar lighter described in connection with FIG. 5 and also used with other electrical accessory devices. The power socket according to the invention thus has functions that are independent from the cigar lighter. Although it can be used to provide power to the cigar lighter described in connection with FIG. 5 herein, it can also be used with other electrical are electronic accessory devices that employ an electrical accessory plug that is compatible with the socket.

As described previously, the universal electrical socket described herein can provide power to accessory devices by means of an electrical plug that interfaces with the universal electrical socket. The electrical socket of the invention can interface also with commercially available plugs, as described above and shown in FIG. 37. The commercially available electrical accessory plug shown in FIG. 37 is slidably received into the universal power socket until the spring actuated positive contact 320 creates an electrical contact with the head of the power outlet rivet 416. One or more ground contacts springs 310 complete the ground return electrical circuit to the well.

FIG. 38 shows how the prior art electrical accessory plug makes contact with the universal socket according to the present invention. As shown, the spring loaded positive contact 320 engages with the head of the rivet 416 to connect to the positive side of the vehicle electrical supply. The spring loaded ground contact 310 engages with the socket well 400 to complete the electrical circuit ground return. As shown, the electrical contact 422 is not used with the prior art electrical accessory plug.

FIG. 39 shows an accessory plug according to the invention that can be employed with the universal power socket in accordance with the present invention. The cable 430 leads to the powered electrical/electronic device. The plug is shown at 500 inserted into the well 400 of the universal socket. The accessory plug includes a cylindrical contact 28A like the electrical contact 28A shown in the cigar lighter of FIG. 5 to provide contact with the contact buttons of the contact plate 422 of the universal socket. It uses a spring loaded ground contact 310 to provide the ground side connection.

FIGS. 40 and 41 show the cigar lighter of FIG. 5 slidably received into the universal power socket in a standby position (FIG. 40) and in the power-on position (FIG. 41). The cylindrical contact element 28A makes contact with the contact fingers of contact plate 422 to provide the positive side vehicle electrical supply to the cigar lighter. All other components shown in FIGS. 40 and 41 have like reference numerals to those shown in FIGS. 5 and 14.

The universal power socket according to the present invention is capable of carrying higher current levels to accessory devices than prior art sockets.

The socket according to the present invention provides a wiping action for the power socket positive side contact when a plug for an accessory device or a cigar lighter having the new cylindrical contact is inserted into the socket. This resolves a problem with the prior art devices, that is, the arcing on the socket and plug positive side contact when the accessory plug or cigar lighter heating unit makes and breaks power.

The power socket according to the present invention provides improved retention of a plug for an electrical accessory device within the socket by the addition of one or more electrical contacts that provide a radial frictional force on the plug or cigar lighter contact 28A.

The cylindrical contact 28A of the power socket according to the present invention provides a non-moving, passive guard to prevent ashes from cigarette products dispersing from the general vicinity of the heating element.

Placement of the socket positive side contacts so that they engage electrically with the inner surface of the cylindrical contact 28A of the lighter/plug provides a cleaning action and reduces the effects of electrical arcing. Furthermore, the placement of the positive side contacts radially disposed from the center of the socket helps to thermally isolate the positive side contacts from the radiant and convective heat transfer from the heating unit of a cigar lighter inserted into the socket.

Moreover, the universal socket is completely compatible with the known electrical plugs employing a spring loaded center contact (FIG. 37) and the positive contacts 422 are protected against damage from the prior art accessory plugs (FIG. 38).

A significant advantage of the universal power socket according to the present invention is that it provides a single configuration of a universal power socket that can be used both with electrical accessory devices and aftermarket cigar lighter units. Furthermore, there is no need to place the thermal protection bimetal element in the universal power socket. Instead, the bimetal protection device, normally mandatory for all cigar lighter sockets, can now be placed in the cigar lighter itself, thereby reducing costs.

The invention also provides an accessory plug that reduces detrimental effects of arcing when the plug makes or breaks electrical power to the power socket. The accessory plug allows for high levels of current draw and provides better retention within the socket than the prior art axially spring loaded devices.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cigar lighter adapted to be received in an electrical socket for energizing a heating element of the cigar lighter comprising:

an electrically conductive body shell adapted to make electrical and mechanical contact with a sleeve of the socket;

a user actuatable knob received in the body shell for telescopic movement therein against the bias of a compression spring;

an electrical heating element disposed at a distal end of the body shell, the electrical heating element having a first electrical terminal in electrical contact with a first electrical contact element disposed around the perimeter of the electrical heating element and adapted to make electrical contact with a first electrical contact of the electrical socket;

the electrical heating element having a second electrical terminal substantially centrally located with respect to the body shell, the second electrical terminal in electrical contact with a centrally disposed fastener;

a first bimetal element held in position by the fastener electrically insulated from the body shell and being in electrical communication with the second terminal of the heating element, the bimetal element including at least two proximally extending engaging clips;

a movable electrical contact arranged for movement with the user actuatable knob, the movable electrical contact being in electrical communication with the body shell, the movable electrical contact having first and second positions whereby, in a first position, when the knob extends proximally, the movable electrical contact is not in electrical engagement with the bimetal engaging clips so that the heating element is not energized and wherein, in a second position, when the knob is moved distally, the movable electrical contact engages with and is held in position by said bimetal engaging clips to energize the heating element with electrical power until a first predetermined temperature is reached at which said bimetal clips flex to release said movable electrical contact from said bimetal engaging clips to de-energize said heating element and allowing said knob to move proximally due to the bias of said spring;

wherein the first electrical contact element comprises a cylindrical contact element surrounding the electrical heating element and extending distally past the electrical heating element to form a cylindrical opening having a smooth inner peripheral electrical contact surface; and wherein the cylindrical contact element is adapted to electrically engage the first electrical contact of the socket on said inner peripheral electrical contact surface of the cylindrical contact element such that there is a smooth sliding contact between the inner peripheral electrical contact surface and the first electrical contact of the socket.

2. The cigar lighter of claim 1, further wherein the heating element is in the shape of a spiral having the first electrical terminal disposed on the outside of said spiral, said first electrical terminal being received through a slot in said cylindrical contact element thereby electrically engaging with said cylindrical contact element, the second electrical terminal being disposed at the inside of said spiral and being in electrical engagement with said centrally disposed fastener.

3. The cigar lighter of claim 2, further comprising a concentric cap disposed outside said cylindrical contact element surrounding at least a part of said cylindrical contact element and fixing said first electrical terminal of said heating element between said cap and an outer periphery of said cylindrical contact element.

4. The cigar lighter of claim 3, further comprising a circumferential groove in the outer periphery of said cylindrical contact element, whereby the first electrical terminal of said heating element is received between said cap and said cylindrical contact element in said groove to provide an electrical connection of said first electrical terminal of said heating element to said cylindrical contact element.

5. The cigar lighter of claim 4, wherein said cap has a circumferential groove on an inner periphery thereof in alignment with the circumferential groove in said cylindrical contact element thereby to fix said first electrical terminal of said heating element between said grooves.

6. The cigar lighter of claim 5, further comprising a ground retainer concentrically disposed about said first bimetal element and electrically insulated therefrom by an insulator, the first bimetal element being disposed on said insulator and held to said insulator by said centrally disposed fastener.

7. The cigar lighter of claim 6, further comprising a second bimetal element in electrical communication with said cylindrical contact element for electrically contacting either said body shell or said ground retainer in the event the temperature of said heating element reaches a second predefined temperature higher than said first temperature to avert a safety hazard.

8. The cigar lighter of claim 7, wherein the second bimetal element extends distally in general alignment with said body shell and moves radially to contact said body shell in the event said second predefined temperature is reached.

9. The cigar lighter of claim 7, wherein the second bimetal element extends proximally and moves radially outward to contact said ground retainer in the event said second predefined temperature is reached.

10. The cigar lighter of claim 1, further comprising a second bimetal element in electrical communication with said first electrical contact element for electrically contacting either said body shell or a part in electrical communication with said body shell in the event the temperature of said heating element reaches a second predefined temperature higher than said first temperature to avert a safety hazard.

11. The cigar lighter of claim 10, wherein the second bimetal element comprises a bimetal planar structure arranged adjacent to and in planar electrical contact with a cap of said first electrical contact element, the bimetal planar structure having at least one activation beam, further comprising an electrical insulating structure disposed adjacent an opposite side of said bimetal planar structure, the electrical insulating structure having a cut-out in alignment with the activation beam, and further comprising a ground retainer element disposed adjacent the electrical insulating structure and electrically insulated from the bimetal planar structure, whereby if the temperature of the heating element reaches the second predefined temperature, the activation beam deflects transversely to the plane of the bimetal planar structure and electrically contacts the ground retainer to short circuit electrical power.

12. The cigar lighter of claim 11, wherein the bimetal planar structure comprises a bimetal disc having radial cut-outs defining the activation beam and the insulating structure comprises an insulating disc.

13. A cigar lighter adapted to be received in an electrical socket for energizing a heating element of the cigar lighter comprising:
an electrically conductive body shell adapted to make electrical and mechanical contact with a sleeve of the socket;
a user actuatable knob received in the body shell for telescopic movement therein against the bias of a compression spring;
an electrical heating element disposed at a distal end of the body shell, the electrical heating element having a first electrical terminal in electrical contact with a first electrical contact element disposed around the perimeter of the electrical heating element and adapted to make electrical contact with a first electrical contact of the electrical socket;
the electrical heating element having a second electrical terminal substantially centrally located with respect to the body shell, the second electrical terminal in electrical contact with a centrally disposed fastener;
a first bimetal element held in position by the fastener electrically insulated from the body shell and being in electrical communication with the second terminal of the heating element, the bimetal element including at least two proximally extending engaging clips;
a movable electrical contact arranged for movement with the user actuatable knob, the movable electrical contact being in electrical communication with the body shell, the movable electrical contact having first and second positions whereby, in a first position, when the knob extends proximally, the movable electrical contact is not in electrical engagement with the bimetal engaging clips so that the heating element is not energized and wherein, in a second position, when the knob is moved distally, the movable electrical contact engages with and is held in position by said bimetal engaging clips to energize the heating element with electrical power until a first predetermined temperature is reached at which said bimetal clips flex to release said movable electrical contact from said bimetal engaging clips to de-energize said heating element and allowing said knob to move proximally due to the bias of said spring;
further comprising a second bimetal element in electrical communication with said first electrical contact element for electrically contacting either said body shell or a part in electrical communication with said body shell in the event the temperature of said heating element reaches a second predefined temperature higher than said first temperature to avert a safety hazard;
wherein the second bimetal element comprises a bimetal planar structure arranged adjacent to and in planar electrical contact with a cap of said first electrical contact element, the bimetal planar structure having at least one activation beam, further comprising an electrical insulating structure disposed adjacent an opposite side of said bimetal planar structure, the electrical insulating structure having a cut-out in alignment with the activation beam, and further comprising a ground retainer element disposed adjacent the electrical insulating structure and electrically insulated from the bimetal planar structure, whereby if the temperature of the heating element reaches the second predefined temperature, the activation beam deflects transversely to the plane of the bimetal planar structure and electrically contacts the ground retainer to short circuit electrical power;

wherein the bimetal planar structure comprises a bimetal disc having radial cut-outs defining the activation beam and the insulating structure comprises an insulating disc; and further comprising asymmetrically located positioning holes in said bimetal disc for allowing said bimetal disc to be oriented in only one concentric orientation with respect to said cap.

14. The cigar lighter of claim 13, wherein aligned asymmetrically located positioning holes are disposed in said cap, bimetal disc, insulating disc and ground retainer, and further comprising locking pins that extend through said holes for locking said elements in only one concentric orientation.

15. The cigar lighter of claim 14, further comprising an electrical and thermal insulator for said first bimetal element, the locking pins extending from said electrical and thermal insulator.

16. The cigar lighter of claim 12, wherein the bimetal disc has a low expansion side and a high expansion side and wherein the low expansion side faces the ground retainer so that the activation beam deflects through the cut-out in the insulating disc to contact the ground retainer if the heating element reaches the second predefined temperature.

17. The cigar lighter of claim 16, wherein the deflection of the bimetal disc is determined by a thickness of said insulating disc.

18. The cigar lighter of claim 10, wherein said second bimetal element extends proximally and flexes radially outwardly to contact said body shell or part in the event said second temperature is reached.

19. The cigar lighter of claim 5, wherein said centrally disposed fastener is a rivet and said second electrical terminal of said heating element is swedged into a slot in a distal head of the rivet.

20. The cigar lighter of claim 1, wherein said movable electrical contact is held in electrical engagement with a proximally directed head of said centrally disposed fastener by pressing said user actuatable knob distally to maintain electrical current flow to said heating element even if said first bimetal element has released the movable electrical contact.

21. The cigar lighter of claim 20, wherein said movable electrical contact is held to said user actuatable knob by a fastener element, the fastener element having a distally disposed head for electrically engaging with the proximally directed head of said centrally disposed fastener to allow electrical current to flow to said heating element.

22. The cigar lighter of claim 21, wherein the fastener element holds said movable electrical contact to a metal shaft coupled for movement by said user actuatable knob.

23. The cigar lighter of claim 22, wherein said spring surrounds said shaft.

24. The cigar lighter of claim 23, wherein said fastener element comprises a screw threaded into said shaft.

25. The cigar lighter of claim 22, wherein a metal body is in electrical engagement with said shaft for slidable movement in said body shell to provide electrical communication between the body shell received in electrical sliding contact with the socket sleeve and said shaft and thus to said movable electrical contact.

26. The cigar lighter of claim 1, wherein the cigar lighter is received in an electrical socket of a motor vehicle.

27. The cigar lighter of claim 1, wherein the user actuatable knob is received telescopically in an outer knob portion surrounding the user actuatable knob.

28. The cigar lighter of claim 1, wherein the cylindrical contact element functions as a non-movable ash guard.

29. The cigar lighter of claim 1, wherein the first electrical terminal of the heating element is secured electrically and mechanically to a coil retainer that surrounds the heating element.

30. The cigar lighter of claim 29, wherein the coil retainer is rolled over around its entire perimeter.

31. The cigar lighter of claim 29, wherein the coil retainer is rolled over to secure the first electrical terminal in a region of the perimeter of the coil retainer comprising only a portion of the perimeter of the coil retainer.

32. The cigar lighter of claim 29, wherein the coil retainer is a separate piece from the first electrical contact element in electrical communication therewith.

33. The cigar lighter of claim 32, wherein the first electrical contact element has an increased diameter in a region surrounding the coil retainer.

34. The cigar lighter of claim 29, wherein the coil retainer and the first electrical contact element are integral.

35. The cigar lighter of claim 29, wherein the coil retainer is held in the first electrical contact element by a plurality of snap tabs or bent tabs formed in the first electrical contact element.

36. The cigar lighter of claim 34, further comprising a cap received over the integral coil retainer in electrical and mechanical engagement therewith.

37. The cigar lighter of claim 36, wherein a bead is rolled into the cap to secure the cap to the coil retainer.

38. The cigar lighter of claim 1, wherein the first electrical contact of the electrical socket comprises spring loaded contacts for electrically engaging with said first electrical contact.

39. The cigar lighter of claim 38, wherein the electrical socket includes retention lances disposed near the spring loaded contacts in a position whereby they will not be distorted when a male accessory electrical plug is inserted in the socket.

40. The cigar lighter of claim 39, further wherein the retention lances have spherical elements for engaging an enlarged diameter region at a distal end of the body shell.

* * * * *